US007945726B2

(12) United States Patent
Faibish et al.

(10) Patent No.: US 7,945,726 B2
(45) Date of Patent: May 17, 2011

(54) PRE-ALLOCATION AND HIERARCHICAL MAPPING OF DATA BLOCKS DISTRIBUTED FROM A FIRST PROCESSOR TO A SECOND PROCESSOR FOR USE IN A FILE SYSTEM

(75) Inventors: Sorin Faibish, Newton, MA (US); Stephen A. Fridella, Belmont, MA (US); Xiaoye Jiang, Shrewsbury, MA (US); Uday K. Gupta, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1137 days.

(21) Appl. No.: 11/382,075

(22) Filed: May 8, 2006

(65) Prior Publication Data

US 2007/0260842 A1    Nov. 8, 2007

(51) Int. Cl.
*G06F 12/00* (2006.01)
(52) U.S. Cl. ............... 711/112; 711/170; 711/E12.002
(58) Field of Classification Search .................. 711/112; 707/693
See application file for complete search history.

(56) References Cited

U.S. PATENT DOCUMENTS

| | | | |
|---|---|---|---|
| 5,206,939 A | 4/1993 | Yanai et al. | |
| 5,828,876 A | 10/1998 | Fish et al. | |
| 5,893,140 A | 4/1999 | Vahalia et al. | |
| 5,901,327 A | 5/1999 | Ofek | |
| 5,960,446 A | 9/1999 | Schmuck et al. | |
| 5,974,424 A | 10/1999 | Schmuck et al. | |
| 6,324,581 B1 | 11/2001 | Xu et al. | |
| 6,389,420 B1 | 5/2002 | Vahalia et al. | |
| 6,453,354 B1 | 9/2002 | Jiang et al. | |
| 6,499,039 B1 | 12/2002 | Venkatesh et al. | |
| 6,571,259 B1 * | 5/2003 | Zheng et al. | 707/205 |
| 6,571,261 B1 | 5/2003 | Wang-Knop et al. | |
| 6,892,211 B2 | 5/2005 | Hitz et al. | |
| 7,010,554 B2 | 3/2006 | Jiang et al. | |
| 7,085,815 B2 | 8/2006 | Dixon et al. | |
| 7,085,909 B2 | 8/2006 | Ananthanarayanan et al. | |
| 2004/0030822 A1 | 2/2004 | Rajan et al. | |
| 2004/0059822 A1 | 3/2004 | Jiang et al. | |
| 2004/0139128 A1 | 7/2004 | Becker et al. | |

(Continued)

OTHER PUBLICATIONS

Uresh Vahalia, Unix Internals: The New Frontiers, Chapter 9, "File System Implementations," 1996, pp. 261-289 and Chapter 11, "Advanced File Systems," pp. 338-371, Prentice-Hall, Inc., New Jersey.

(Continued)

*Primary Examiner* — Reginald G Bragdon
*Assistant Examiner* — Hamdy S Ahmed
(74) *Attorney, Agent, or Firm* — Richard Auchterlonie; Novak Druce & Quigg, LLP

(57) ABSTRACT

In a data processing system, a first processor pre-allocates data blocks for use in a file system at a later time when a second processor needs data blocks for extending the file system. The second processor selectively maps the logical addresses of the pre-allocated blocks so that when the pre-allocated blocks are used in the file system, the layout of the file system on disk is improved to avoid block scatter and enhance I/O performance. The selected mapping can be done at a program layer between a conventional file system manager and a conventional logical volume layer so that there is no need to modify the data block mapping mechanism of the file system manager or the logical volume layer. The data blocks can be pre-allocated adaptively in accordance with the allocation history of the file system.

10 Claims, 25 Drawing Sheets

U.S. PATENT DOCUMENTS

| | | | |
|---|---|---|---|
| 2005/0044162 | A1 | 2/2005 | Liang et al. |
| 2005/0065986 | A1 | 3/2005 | Bixby et al. |
| 2005/0066095 | A1 | 3/2005 | Mullick et al. |
| 2005/0114358 | A1* | 5/2005 | Chen et al. .................... 707/100 |
| 2005/0210218 | A1* | 9/2005 | Hoogterp .................... 711/203 |
| 2005/0240628 | A1 | 10/2005 | Jiang et al. |
| 2005/0273570 | A1 | 12/2005 | DeSouter et al. |
| 2006/0064554 | A1 | 3/2006 | Fridella et al. |
| 2006/0143412 | A1 | 6/2006 | Armangau |
| 2007/0055702 | A1 | 3/2007 | Fridella et al. |
| 2007/0136548 | A1 | 6/2007 | Mane |

OTHER PUBLICATIONS

Enginuity: The Symmetrix Storage Operating Environment, EMC White Paper, Jul. 2005, 21 pages, EMC Corporation, Hopkinton, MA.

Wayne Rickard et al., "Shared Storage Model—A framework for describing storage architectures," Apr. 13, 2003, 41 pages, Storage Networking Industry Association, San Francisco, CA.

Integration of EMC SRDF and TimeFinder with Sun Cluster 3, EMC White Paper, Jan. 13, 2005, 11 pages, EMC Corporation, Hopkinton, MA.

EMC TimeFinder Family—The most powerful suite of local replication solutions for increased application availability and faster data recovery, EMC Data Sheet, Oct. 2004, 8 pages, EMC Corporation, Hopkinton, MA.

Shiv Sikand and Roger March, "Highly Scalable, High Performance Perforce Server Environments," Perforce User Conference, May 8-9, 2003, Las Vegas, NV, 11 pages, Perforce Software Inc., Alameda, CA.

Sukwoo Kang and A. L. Narasimha Reddy, "Virtual Allocation: A scheme for flexible storage allocation," Proc. of OASIS workshop in conjunction with ASPLOS, Oct. 9-13, 2004, Boston, MA, 6 pages, Association for Computing Machinery, Washington, DC.

J. Menon et al., "IBM StorageTank—A heterogeneous scalable SAN file system," IBM Systems Journal, vol. 42, No. 2, 2003, pp. 250-267, IBM Corporation, San Jose, CA.

EMC Celerra HighRoad, EMC White Paper, Jan. 2002, 13 pages, EMC Corporation, Hopkinton, MA.

Steve Fridella et al., "Elements of a Scalable Network File System Protocol," NEPS Workshop at the University of Michigan, Ann Arbor, MI, Dec. 4, 2003, position paper (5 pages) and presentation ("Building a Scalable NFS," 13 pages), EMC Corporation, Hopkinton, MA.

Reiser4, published before Dec. 7, 2005, 55 pages, Namesys, Oakland, CA.

Stephen Tweedie, "EXT3, Jounaling Filesystem," Ottawa Linux Symposium, Ottawa Congress Centre, Ottawa, Ontario, Canada, Jul. 20, 2000, 22 pages.

"Shared Storage Cluster Computing," Jan. 27, 2005, 22 pages, Panasas, Fremont, CA.

* cited by examiner

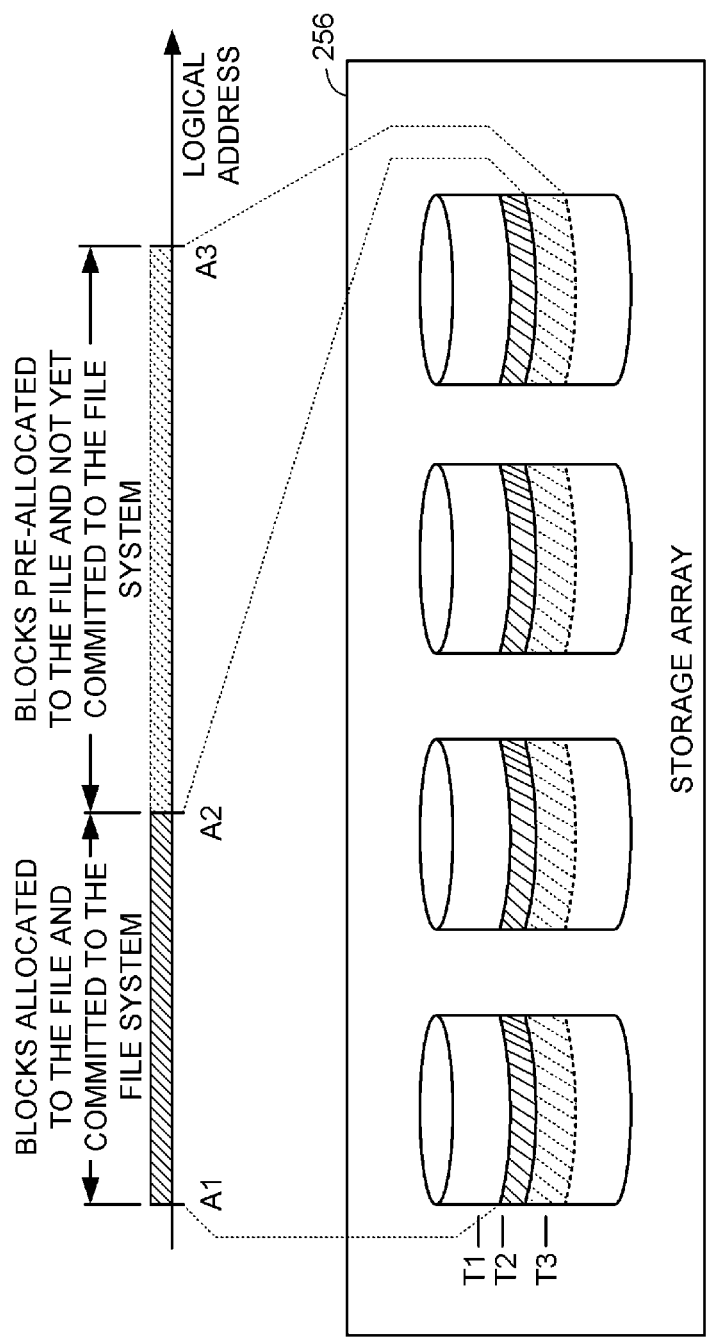
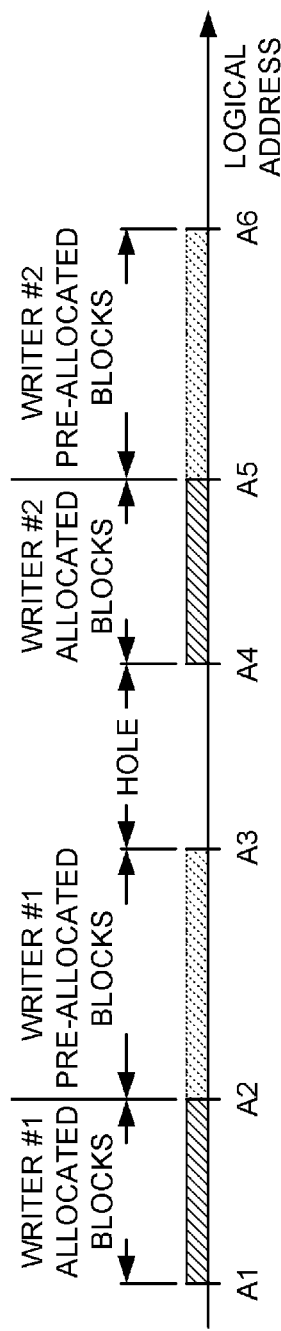
FIG. 11
FIG. 12

PRE-ALLOCATION AND HIERARCHICAL MAPPING OF DATA BLOCKS DISTRIBUTED FROM A FIRST PROCESSOR TO A SECOND PROCESSOR FOR USE IN A FILE SYSTEM

FIELD OF THE INVENTION

The present invention generally relates to computer data storage systems, and more particularly to network file servers. The present invention specifically relates to a data processing system in which a first processor distributes data blocks to a second processor for use in creating or extending files of a file system.

BACKGROUND OF THE INVENTION

Mainframe data processing, and more recently distributed computing, have required increasingly large amounts of data storage. This data storage has been most economically provided by an array of low-cost disk drives integrated with a large semiconductor cache memory.

Many applications access data that is stored in files of a file system. The file system is a hierarchical arrangement of the files such that a particular file has a path name through the file system. The path name includes a sequence of names beginning with the name of a root directory of the file, possibly including the names of one or more sub-directories, and ending with a name for the file. The file system also includes a mapping of the directories and files in the file system to file system blocks, and a mapping of the file system blocks to logical blocks of storage.

In order to access data of a file, an application program sends one or more file access requests to a system program known as a file system manager. The application program typically specifies a pathname for the file, an offset from the beginning of the file, and an extent of data to be read or written starting at the offset in the file. For example, the offset is a specified number of bytes from the beginning of the file, and the extent of data is a specified number of consecutive bytes starting at the offset in the file. The file system manager maps the file name, offset, and extent to logical file system blocks mapped to logical blocks of storage, and sends logical block access commands to a volume manager or storage subsystem.

The volume manager or storage subsystem maps the logical blocks of storage to physical blocks of storage in storage devices such as disk drives. This logical-to-physical mapping may involve striping of the extent of data across a redundancy group of disk drives in a Redundant Array of Inexpensive Disks (RAID).

In the data processing art, there has been a general trend to specialize and distribute data processing tasks among an increasing number data processors. For example, more than a decade ago, it was common for a mainframe computer to be programmed with a file system manager and various application programs that invoked the file system manger in order to access files of the file systems. In turn, the mainframe computer sent logical block access commands to another mainframe processor of a cached disk array.

More recently, it has been common for application programs to be executed by workstations such as personal computers networked to file servers. Each file server is programmed with a file system manager. Each file server may include a volume manager for access to storage of disk drives in the file server. However, file servers have been networked or clustered in various ways to enable share access to storage subsystems or arrays of disk drives by multiple workstations.

Data consistency problems may arise if two file servers share access to the same file system in storage. As described in Xu et al. U.S. Pat. No. 6,324,581, one way to solve this data consistency problem is to designate one of the file servers to be an exclusive owner of access rights to each file system. The exclusive owner of the access rights to a file system, however, may delegate data access or metadata management tasks to other file servers. For example, if a first file server receives a request from a network client for access to a file system owned by a second file server, then the first file server sends a metadata request to the second file server. The second file server responds by placing a lock on the file and returning metadata of the file. The first file server uses the metadata of the file to formulate a data access command that is used to access the file data in the file system directly to the disk array over a bypass data path that bypasses the second file server.

As further described in Jiang et al. U.S. patent application Publication 2005/0240628 published Oct. 27, 2005, metadata management in a file server or storage network is delegated from a primary data processor to a secondary data processor in order to reduce data traffic between the primary data processor and the secondary data processor. The primary data processor retains responsibility for managing locks upon objects in the file system that it owns, and also retains responsibility for allocation of free blocks and inodes of the file system. The leasing of free blocks and inodes to the secondary and the granting of locks to the secondary enables the secondary to perform other metadata management tasks such as appending blocks to a file, truncating a file, creating a file, and deleting a file.

SUMMARY OF THE INVENTION

In accordance with one aspect, the present invention provides a method of operating a primary data processor and a secondary data processor for access to a file system in data storage. The method includes the primary data processor pre-allocating data blocks of the data storage to the file system before the pre-allocated data blocks are needed for extending the file system, and the secondary data processor using at least some of the pre-allocated data blocks for extending the file system. The method further includes selecting an address mapping for at least some of the pre-allocated blocks in order to reduce block scatter on disk and improve I/O performance.

In accordance with another aspect, the invention provides a method of operating a primary data processor and a secondary data processor for access to a file system in data storage. The method includes the primary data processor pre-allocating data blocks of the data storage to the file system before the pre-allocated data blocks are needed by the secondary data processor for extending the file system, and the secondary data processor using at least some of the pre-allocated data blocks for extending the file system. The primary data processor pre-allocates an initial chunk size of data blocks when the file system is created, and upon expiration of a release timeout duration from the pre-allocation of the initial chunk size, the secondary data processor releases to the primary data processor an excess of the pre-allocated data blocks over a release threshold.

In accordance with still another aspect of the present invention, a data processing system includes data storage, a primary data processor programmed for pre-allocating data blocks of the data storage to a file system in the data storage before the pre-allocated data blocks are needed for extending the file system, and a secondary data processor coupled to the data storage for access to the file system in the data storage and coupled to the primary data processor for obtaining a map of the data blocks pre-allocated to the file system. The data processing system is further programmed for selecting an address mapping of at least some of the pre-allocated data blocks in order to reduce block scatter on disk and improve I/O performance.

BRIEF DESCRIPTION OF THE DRAWINGS

Additional features and advantages of the invention will be described below with reference to the drawings, in which:

FIG. 11 is a schematic diagram showing logical-to-physical address mapping and a preferred distribution of physical storage blocks on disk for data blocks allocated and pre-allocated to a file;

FIG. 12 is a schematic diagram showing logical addresses of a sparse file having data blocks allocated and pre-allocated to different processes writing to the file;

Figure 1:
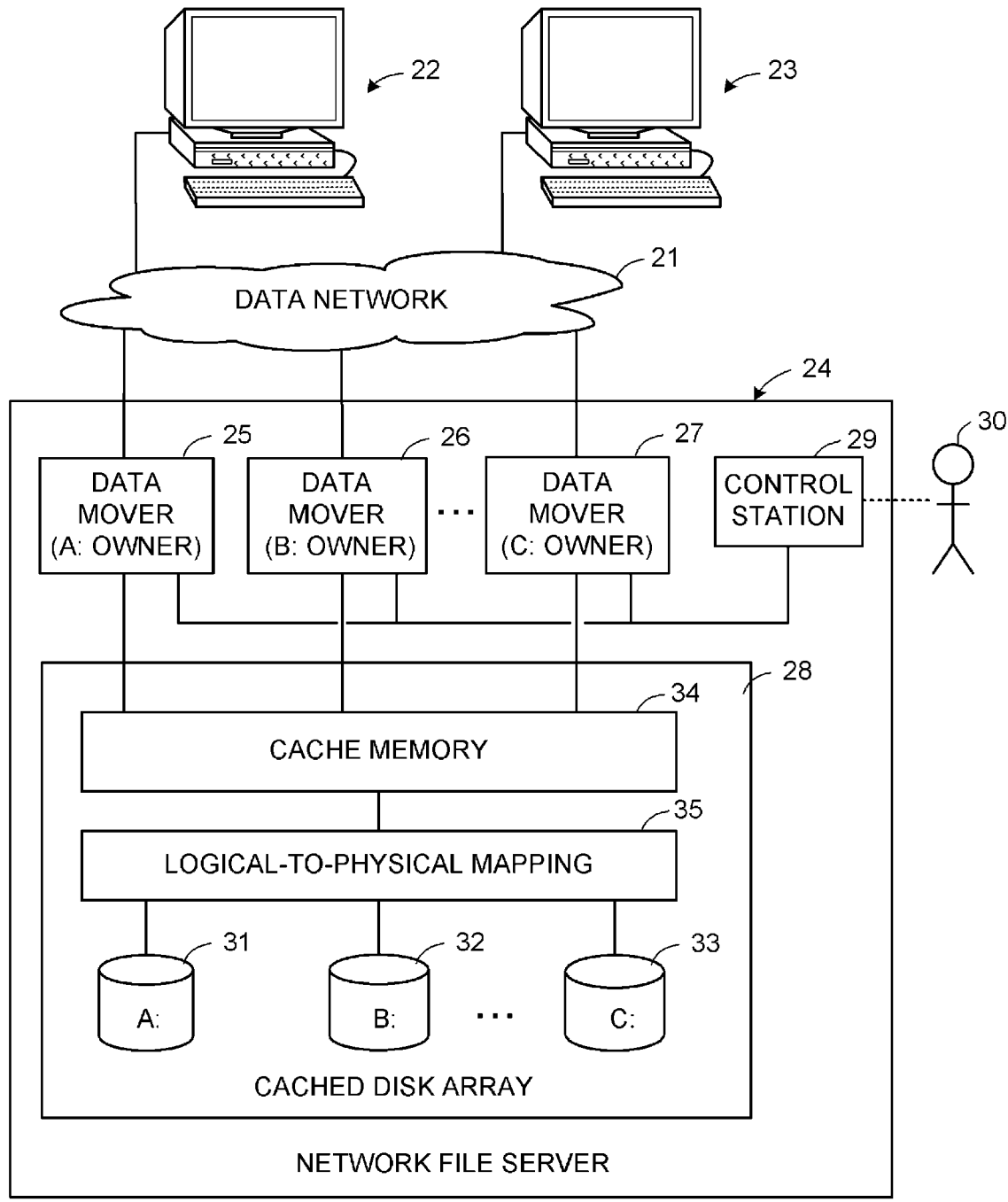
FIG. 1 is a block diagram of a data processing system including a network file server having multiple data mover computers.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENTS

With reference to FIG. 1, there is shown a data processing system incorporating the present invention. The data processing system includes a data network 21 interconnecting a number of clients 22, 23 and servers such as a network file server 24. The data network 21 may include any one or more of network connection technologies, such as Ethernet, and communication protocols, such as TCP/IP. The clients 22, 23, for example, are workstations such as personal computers using either UNIX or Microsoft Windows operating systems. Various aspects of the network file server 24 are further described in Vahalia et al., U.S. Pat. No. 5,893,140 issued Apr. 6, 1999, incorporated herein by reference, Xu et al., U.S. Pat. No. 6,324,581, issued Nov. 27, 2002, incorporated herein by reference, Vahalia et al., U.S. Pat. No. 6,389,420, incorporated herein by reference, and Jiang et al., U.S. patent application Publication 2005/0240628, published Oct. 27, 2005, incorporated herein by reference.

The network file server 24 includes a cached disk array 28 and a number of data mover computers, for example 25, 26, 27, and more. The network file server 24 is managed as a dedicated network appliance, integrated with popular network file systems in a way, which, other than its superior performance, is transparent to the end user. The clustering of the data movers 25, 26, 27 as a front end to the cache disk array 28 provides parallelism and scalability. Each of the data movers 25, 26, 27 is a high-end commodity computer, providing the highest performance appropriate for a data mover at the lowest cost. The network file server 24 also has a control station 29 enabling a system administrator 30 to configure and control the file server.

In the network environment of FIG. 1, is usually desirable to permit any of the clients 22, 23 to access the same file in storage of the cached disk array 28 from any of the data movers 25, 26, 27. To ensure data consistency in this situation, a respective one of the data movers is designated as the exclusive owner of each file for the purpose of granting read-write access to the file. For example, files in the storage of the cached disk array 28 are organized into disjoint file systems such as the file system 31 named "A:" and owned by the data mover 25, the file system 32 named "B:" and owned by the data mover 26, and the file system 33 named "C:" and owned by the data mover 27.

The cache disk array 28 includes a cache memory 34 for storing most recently accessed logical data blocks. If a logical data block to be accessed is not found in the cache memory, then the cache disk array performs a logical-to-physical mapping 35 to recall the data block from disk storage of the file systems 31, 32, 33. The logical-to-physical mapping 35, for example, may stripe contiguous data of a file across a redundancy group of disk drives in accordance with a particular RAID level.

If a data mover receives a client request for read-write access to a file in a file system that the data mover does not own, then the data mover owning the file system is said to be primary with respect to access to the file, and the data mover having initially received the request from the client is said to be secondary with respect to access to the file. In this situation, the secondary data mover can either forward the request to the primary data mover, or the secondary data mover can request a lock upon the file from the primary data mover, and access the file once the primary data mover grants the lock to the secondary data mover. The forwarding technique is preferred when the read-write access involves a relatively small amount of data to be read or written. Otherwise, it is preferred for the secondary data mover to access the file directly once the primary data mover grants a lock to the secondary data mover.

In the network file server 24, the secondary data mover can also request metadata for access to a file owned by the primary data mover. In response to the metadata request, upon granting the lock upon the file, the primary data mover returns to the secondary data mover metadata specifying data storage locations in the cached disk array 28 for storing data of the file. The secondary data mover uses the metadata to produce at least one data access command for accessing the data storage locations in the cached disk array for storing data of the file. For a write operation, the secondary data mover may modify the metadata. When the secondary data mover is finished writing to the file, the secondary data mover returns any modified metadata to the primary data mover. See, for example, Xu et al. U.S. Pat. No. 6,324,581.

As described in Jiang et al. U.S. Patent Publication 2005/0240628, the primary data mover can also lease free file system inodes and free data blocks to the secondary data mover so that the secondary data mover can perform metadata management tasks such as appending blocks to a file, creating a file, modifying a file, and deleting a file.

Figure 2:
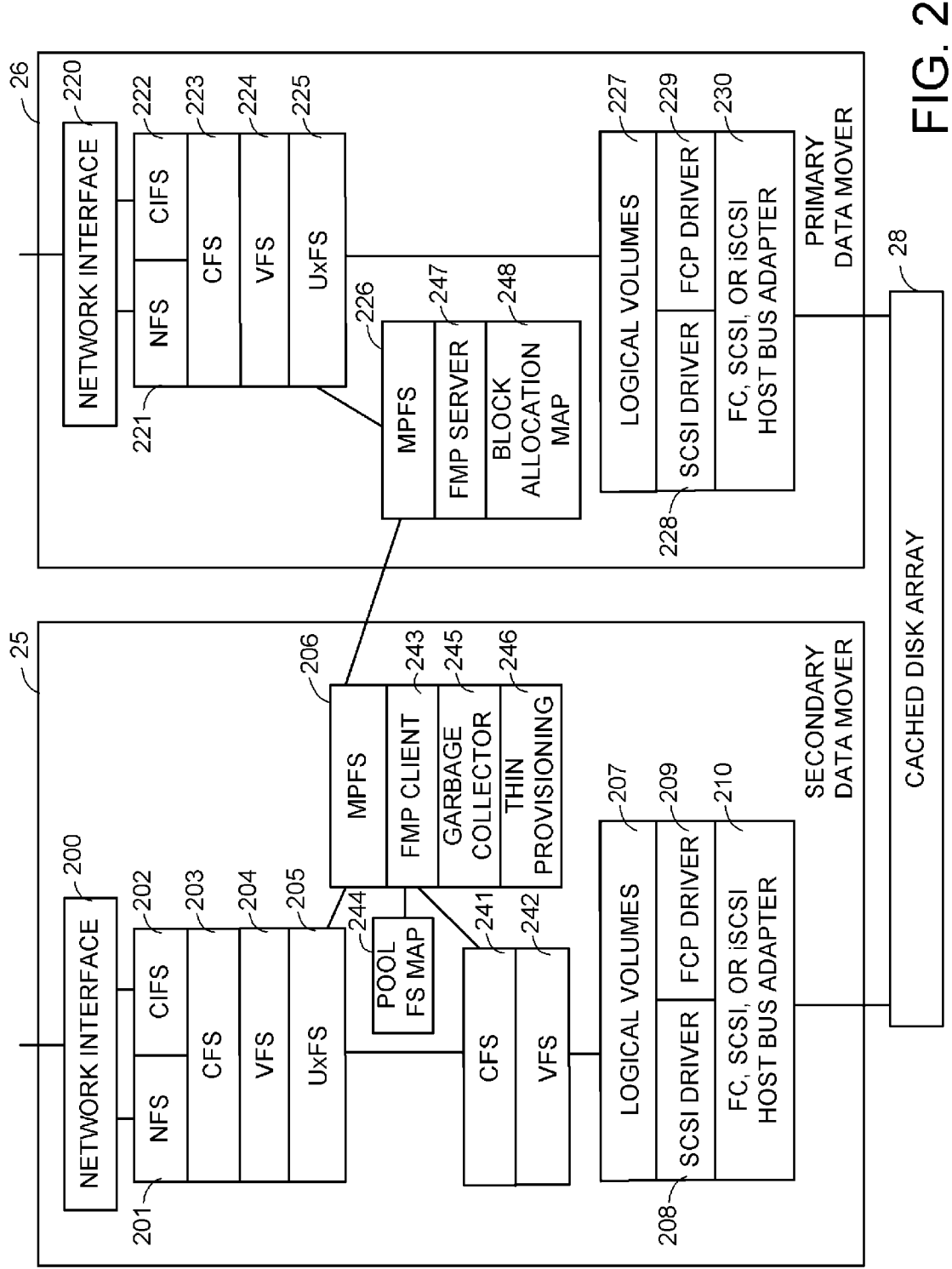
FIG. 2 shows various components of a pair of data mover computers in the file server of FIG. 1.

FIG. 2 shows various software modules of the data movers 25 and 26 in the network file server of FIG. 1. As shown in FIG. 2, the data mover 25 has been programmed as a secondary data mover for performing metadata management tasks upon file systems owned by other data movers, and the data mover 26 has been programmed to function as a primary data mover with respect to metadata management tasks upon file systems that it owns.

The data mover 25 has a network interface 200 for communication of data packets over the data network (21 in FIG. 1) via a data transmission protocol such as TCP/IP. The data mover 25 also has a Network File System (NFS) module 201 for supporting communication with network clients over the data network 21 using the NFS file access protocol, and a Common Internet File System (CIFS) module 202 for supporting communication with network clients over the data network using the CIFS file access protocol. The NFS module 201 and the CIFS module 202 are layered over a Common File System (CFS) module 203, and the CFS module is layered over a Virtual File System (VFS) module 204. The VFS module 204 is layered over a Universal File System (UxFS) module 205. The UxFS module 205 supports a UNIX-based file system, and the CFS module 203 provides higher-level functions common to NFS and CIFS.

If the UxFS module 205 receives a request to access a file system owned by another data mover, then it access a Multiplex File System (MPFS) module 206. The MPFS module 206 decides whether to forward the file access request to the data mover owner of the file system, or to request metadata of the file from the data mover owner of the file system, so that the UxFS module 205 may use the metadata for accessing the file.

The UxFS module 205 accesses data organized into logical volumes defined by a module 207. Each logical volume maps to contiguous logical storage addresses in the cached disk array 28. The module 207 is layered over a SCSI driver 208 and a Fibre-Channel protocol (FCP) driver 209. The data mover 25 sends storage access requests through a host bus adapter 210 using the SCSI protocol, the iSCSI protocol, or the Fibre-Channel protocol, depending on the physical link between the data mover 25 and the cached disk array 28.

The primary data mover 26 includes modules 220 to 230 that are similar to respective modules 200 to 210 of the secondary data mover 25.

In accordance with an aspect of the present invention, the secondary data mover 25 is programmed with a File Mapping Protocol (FMP) client module 243 for obtaining an allocation of free data blocks from the primary data mover. The primary data mover has a FMP server 247 that creates and manages a file system used as a pool of free data blocks that have been reserved for allocation to file systems that are owned by the primary data mover. The FMP server 247 responds to a request for data blocks from the FMP client by allocating free pool file system data blocks to the secondary data mover and returning a map of these allocated pool file system data blocks to the FMP client. The map of these allocated data blocks, for example, is in the form of list of logical offset/range in logical volumes on the cached disk array 28.

The FMP server 247 maintains a block allocation map 248 indicating the data blocks that have been reserved for use by the primary data mover and which of these data blocks have been leased out to each secondary data mover. This pool file system includes a multiplicity of sparse files, which the primary data mover may allocate to respective secondary servers or external hosts to use as a source of file system inodes and file system data blocks or as logical raw volumes on which to build UxFS or other host file systems.

The FMP client 243 of the secondary data mover 25 maintains a pool file system map 244 indicating the files and data blocks that have been allocated by the primary data mover to the secondary data mover. The FMP client 243 also has the ability to select data blocks from this pool so that the selected data blocks will have physical addresses especially suited to the type of access to be performed by the secondary data mover 25. Because the selected data blocks are to be linked into particular files, the selected data blocks should also have particular logical addresses. Thus, the FMP client also is provided with an ability to select and set a desired logical-to-physical address mapping for the selected data blocks.

When allocating data blocks to a file or file system, the FMP client 243 can adjust the logical-to-physical mapping of the selected data blocks independent of the data block mapping by the UxFS module 205 and independent of the logical-to-physical mapping of the logical volumes provided by the logical volumes module 207. For this purpose, the secondary data mover 25 is programmed with a second CFS module 241 and a second VFS module 242 layered below the UxFS module 205 and above the logical volumes module 207. In effect, the CFS module 241 and VFS module 242 provide a logical-to-logical address translation or re-mapping for the logical data blocks.

Typically the FMP server 247 will respond to a request from the FMP client for free data blocks by filling the pool FS map with many more data blocks than are presently needed. After a certain timeout a garbage collector daemon 245 checks whether this excess capacity has dropped to a certain release threshold, and if not, the excess allocated capacity over the release threshold is released back to the pool FS map, and the released data blocks are given back to the primary data mover owner of the pool file system. In this fashion, the garbage collection process ensures that the pool file system is not wastefully utilized.

A thin provisioning module 246 is provided to support sparse files. The thin provisioning module 246 keeps track of data blocks that are not yet actually used in sparse files. The thin provisioning module 246 may adjust a reserve threshold of data blocks that should be kept in the pool file system to support sparse files. The FMP client 243 requests the primary data mover to replenish the pool file system when the number of data blocks in the pool file system falls below the reserve threshold. The thin provisioning module 246 may pre-allocate data blocks of the pool FS map to the data blocks that are not yet actually used in the sparse files when data blocks are available, and may release such pre-allocated data blocks when there is a need for free data blocks that is not met by the primary data mover when the FMP client requests the primary data mover to replenish the pool file system when the number of data blocks in the pool file system falls below the reserve threshold. The primary server 26 can also revoke or request back pre allocated blocks unused by the secondary server to maintain the reserve threshold at a given level, before asking for more disk capacity to the storage array.

Figure 3:
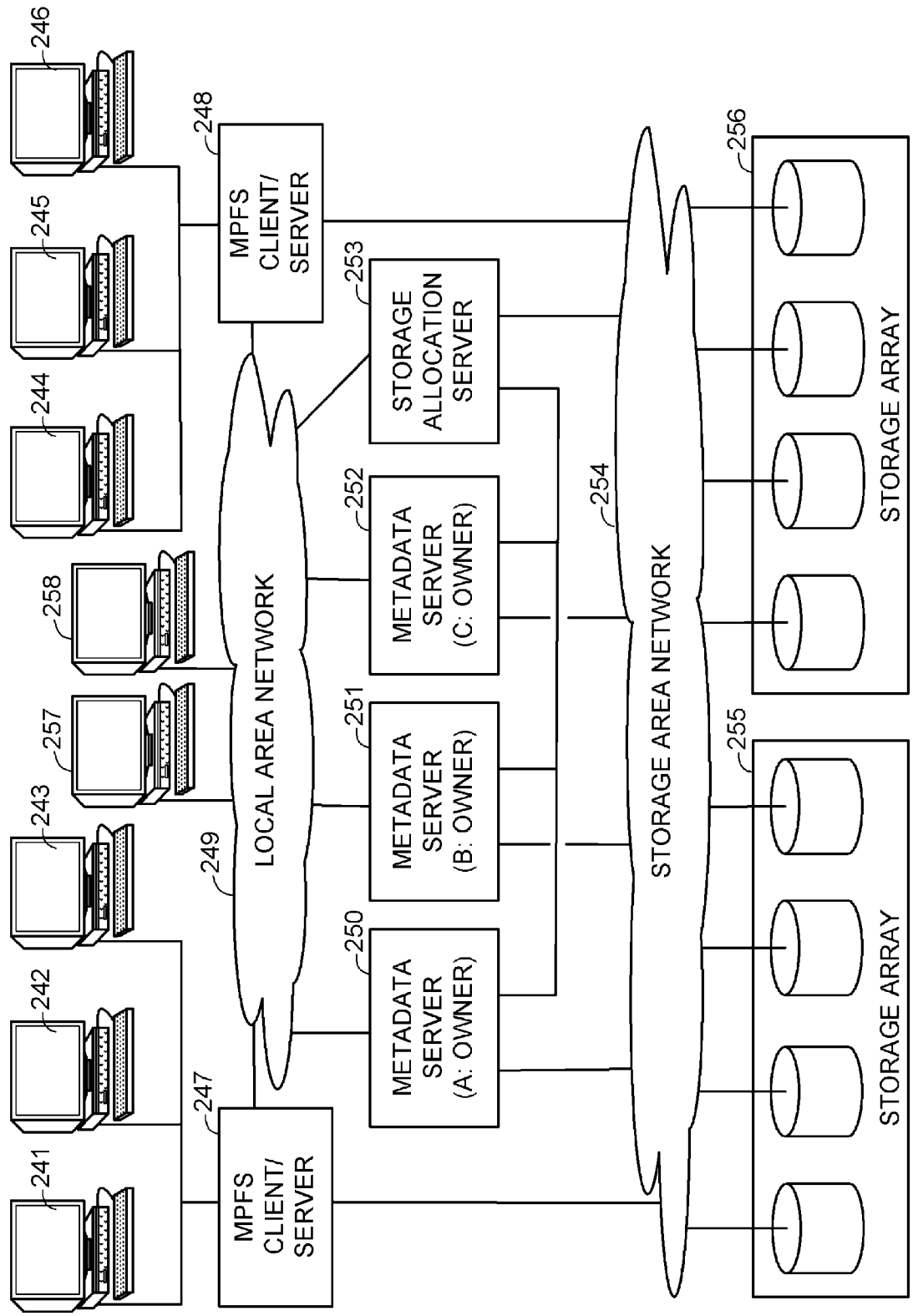
FIG. 3 is a block diagram of a data processing system in which processor functions are further specialized and dedicated to network client servicing, metadata management, and storage allocation.

FIG. 3 shows a data processing network in which processor functions are further specialized and dedicated to network client servicing, metadata management, and storage allocation. User workstations 241, 242, and 243 are supported by an MPFS client/server 247 (similar to the server 24 in FIG. 1 and using file system 250 as a pool file system), and user workstations 244, 245, 246 are supported by an MPFS client/server 248. A local area network 249 conveys metadata requests from the MPFS client/servers 247 and 248 to metadata servers 250, 251, 252. The metadata servers 250, 251, and 252 request allocations of free data blocks from a storage allocation server 253. The storage allocation server responds to a request for data blocks by returning a map of allocated data blocks in the form of lists of offset/range of disk blocks in disk storage devices accessible via a storage area network 254. The metadata servers 250, 251, 252 may also service directly file access requests from NFS clients 257, 258 in the local area network 249.

The storage allocation server 253 divides the free storage up into disjoint sets and allocates a respective one of the disjoint sets to each of the metadata servers for use in extending the respective file systems owned by each of the metadata servers. Thus, the storage allocation server 253 delivers a respective map of the free storage to each metadata server 250, 251, 252 without having to worry about data consistency because each metadata server is given access to a respective disjoint set of disk blocks so locking conflicts do not arise between the metadata servers.

The MPFS client/servers 247, 248, the metadata servers 250, 251, 252, and the storage allocation server 253 are linked via the storage area network 254 to a number of storage arrays 255 containing disk drives. By using the iSCSI protocol, the storage area network 254 can be extended to a wide area network making this cluster architecture scalable without limits.

The MPFS client/servers 247, 248 read and write client data over the storage area network 254 to the disk drives in the storage arrays 255, 256 at physical addresses (e.g., at disk blocks of 512 bytes) specified by metadata obtained from the metadata servers 250, 251, 252 acting as storage allocation servers. The metadata servers commit metadata changes to the on-disk file systems by transmitting the metadata changes over the storage area network 254 to the disk drives in the storage arrays 255, 256. For recovery purposes, the storage allocation server 253 keeps an on-disk record of the respective disjoint sets of disk blocks allocated to each of the metadata servers.

In the system of FIG. 3, each metadata server 250, 251, 252 may delegate metadata management tasks to the MPFS client/servers, in the fashion described above with respect to the system of FIG. 1. Thus, each metadata server may lease to one of the MPFS client/servers some of its data blocks not yet used in file systems owned by the metadata server. For example, in the system of FIG. 3, the metadata server responds to a request for data blocks from one of the MPFS client/servers by returning a map of data blocks in terms of lists of offset/range in disk storage devices in the storage arrays 255, 256.

Figure 4:
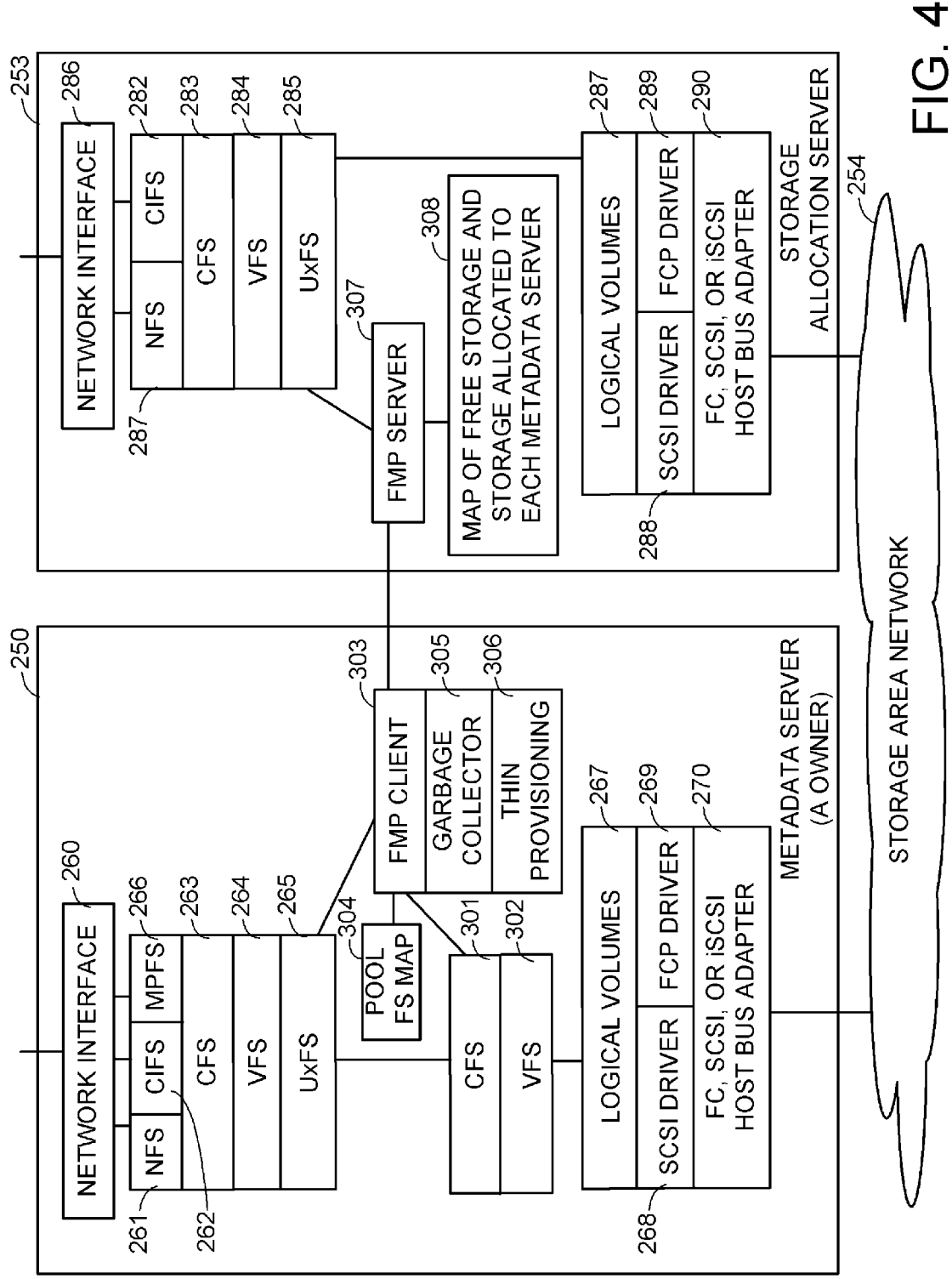
FIG. 4 shows various components of a metadata server and a storage allocation server in the data processing system of FIG. 3.

FIG. 4 shows various components of the metadata server 250 and the storage allocation server 253 in the data processing network of FIG. 3. The components 260 to 306 in the metadata server 250 of FIG. 4 are similar to the respective components 200 to 246 of the secondary data mover 25 of FIG. 2. The MPFS module 266, however, is located between the network interface 260 and the CFS module 263 in order to intercept metadata requests from the MPFS client/servers 247 and 248 in FIG. 3. The components 286 to 308 of the storage allocation server 253 are similar to the respective components 220 to 248 of the primary data mover 26 of FIG. 2.

The storage allocation server 253 maintains a local map 308 of free storage and storage allocated to each metadata server, and allocates this free storage to the metadata servers as needed. It may as well serve metadata to other MPFS clients. The local map 308 need not identify all of the free storage available via the storage area network 254. Also, once a metadata server commits its allocated storage to a file system that it owns, the storage allocation server need not continue to keep a record of the allocated storage for recovery purposes. Thus, the metadata server returns a commit message indicating that the storage allocated to it is no longer free, and the storage allocation server responds to this commit message by removing the committed storage from its free storage blocks in map 308.

The allocation of free storage blocks by a primary server to a secondary server in the system of FIG. 1 can be done in the same way as described above for the allocation of free storage blocks by the storage allocation server 253 to a metadata server in the system of FIG. 3. Also, the same storage block allocation method can be done in data processing systems having other configurations. For example, the control station 29 in the network file server 24 of FIG. 1 could be programmed to perform the storage allocation server function of allocating blocks of storage to the data movers as needed from a respective disjoint set of storage for the file systems owned by each of the data movers. Alternatively, one of the data movers in the network file server 24 could be programmed to perform this allocation server function. In a similar fashion, the storage allocation server 253 in the data processing system of FIG. 3 could be programmed to function also as a metadata server for certain file systems owned by the storage allocation server.

Figure 5:
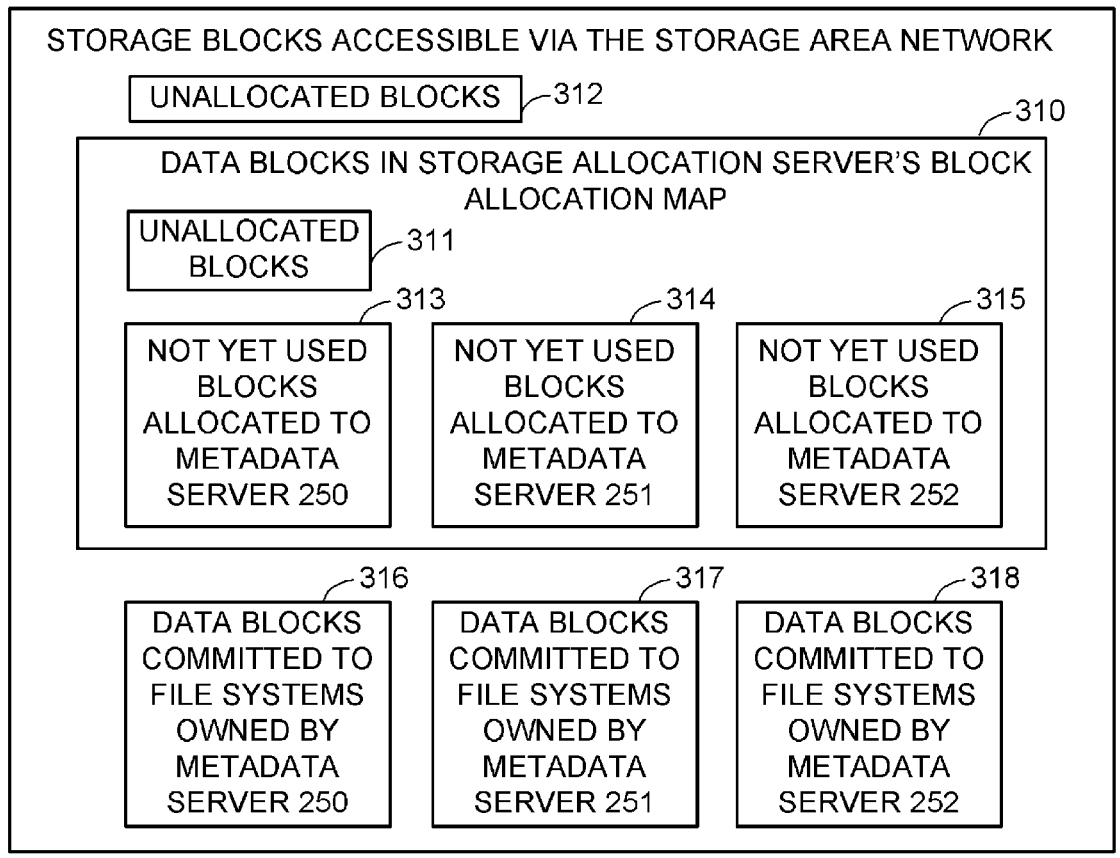
FIG. 5 shows various sets of storage blocks accessible via a storage area network in the data processing system of FIG. 3.

FIG. 5 shows various sets of storage blocks accessible via a storage area network in the data processing system of FIG. 3. The data blocks 310 in the storage allocation server's local block allocation map includes unallocated blocks 311 in the pool file system, and also there may be unallocated blocks 312 that are not included in the storage allocation server's block allocation map not used by the pool file system. For example, the storage area network may contain unallocated disk storage blocks 312 in newly added storage not yet reported to or discovered by the storage allocation server. The data blocks 310 in the storage allocation server's block allocation map further includes not yet used blocks 313 allocated to the metadata server 250, not yet used blocks 314 allocated to the metadata server 251, and not yet used blocks 315 allocated to the metadata server 252. The storage blocks accessible via the storage area network (but not in the storage allocation server's block allocation map) also include data blocks 316 committed to file systems owned by the metadata server 250, data blocks 317 committed to file systems owned by the metadata server 251, and data blocks 318 committed to file systems owned by the metadata server 252 and committed to the pool file system by the metadata servers 251, 252 and 253.

When the storage allocation server determines that a metadata server has failed, any uncommitted blocks processed by the metadata server are lost. Therefore, the allocation server can access its local block allocation map to reclaim the not yet used blocks that were allocated to the failed metadata server. If the storage allocation server fails, the metadata servers can continue processing with the not yet used blocks that have been allocated to them.

Figure 6:
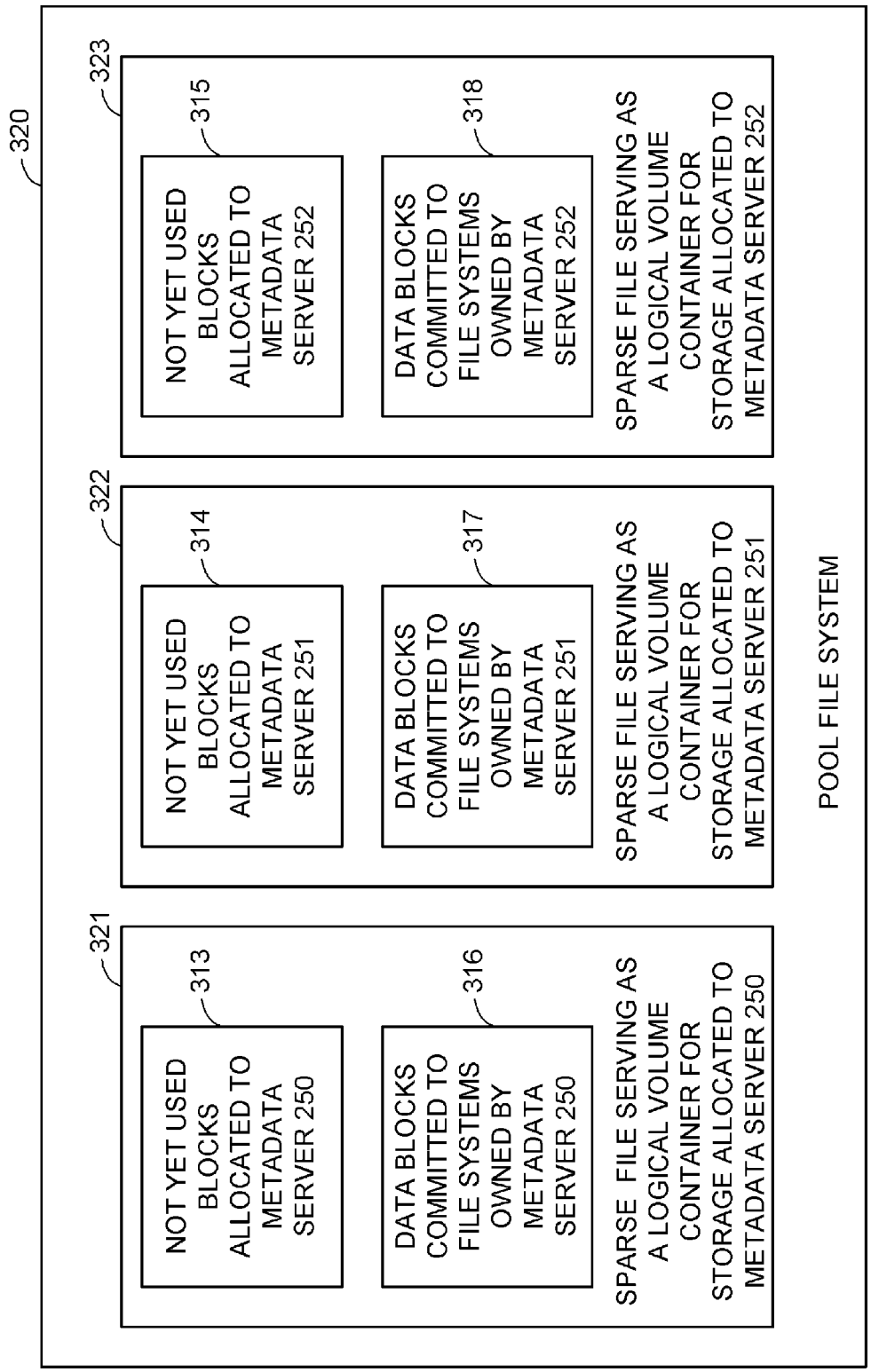
FIG. 6 is a block diagram of a pool file system for the metadata servers in the data processing system of FIG. 3.

The storage allocation server should keep its local map 308 full of sufficient free storage for satisfying promptly requests for allocation from the metadata servers, and the storage allocation server should allocate sufficiently large chunks of storage to the metadata servers so that as data blocks are allocated to files, the data blocks will not be scattered poorly on the physical disk. For example, the storage allocation server allocates large chunks of storage to a respective sparse file for each metadata server. This sparse file serves as a storage pool or logical volume container for storage allocated to the metadata server. Thus, as shown in FIG. 6, the sparse file 321 for the metadata server 250 contains the not yet used blocks 312 allocated to the metadata server 250, and data blocks 316 committed to file systems owned by the metadata server 250. The sparse file 321 itself is included in the pool file system 320. The pool file system 320 includes a sparse file 322 for the metadata server 251, and a sparse file 323 for the metadata server 252, further committed to the pool file system by the metadata servers 250, 251 and 252 respectively.

By maintaining each pool file system file allocated to the metadata server 250, 251 or 252 as a sparse file, the metadata server need not have the entire map of the pool file system blocks all of the time, and the number of blocks allocated to the pool file system may increase as blocks are written to the file systems owned by the metadata servers. The structure of the file systems owned by the metadata servers, however, should be aligned to the structure of the pool file system. Otherwise, the blocks of the file systems owned by the metadata server will possibly be fragmented on the pool file system and as a result scattered very badly on the physical disk resulting in poor I/O performance.

In order to solve this alignment problem, the FMP client 303 requests a large number of pool FS blocks to be allocated; for example, for each new UxFS file system file opened by the metadata server 250, an entire Cylinder Group of the pool file system will be requested from the storage allocation server, even if it may only use one single UxFS file system block at the time of the initial request. Because the pool file system is also a UxFS file system, the secondary file system will grow using the same structure as the pool file system. After a certain timeout the garbage collector daemon 305 releases the unused pool file system blocks allocated to the secondary server and not used. This garbage collection process ensures that the pool file system is properly utilized not wastefully. In a similar manner, when a sparse file is used as a raw volume, the storage allocation server allocates file system blocks in a structure matching the structure of the file system laid on the raw logical volume.

The FMP client 303 adapts to the structure of the raw volume layout and allocates blocks in the pool file system according to the behavior of the file systems that it owns. If the metadata server supports different kinds of file systems (such as ext3 or xfs in addition to UxFS), then the behavior depends on the particular kind of file system. In this case, it may be desirable for the pool file system to include, for each metadata server, a separate file of pre-allocated blocks for each different kind of file system. Therefore it is possible to improve performance of file systems that do not possess good block allocation techniques by improving the layout of the data blocks on the physical disk for enhanced I/O performance.

It is also possible that different file systems of the same type but used for different applications or system tasks (such as an electronic mail archiving application, or a seismic data processing application, or a database application, or a snapshot copy task) may exhibit different behavior. In this case, it also may be desirable for the pool file system to include, for each metadata server, a separate file of pre-allocated blocks for each file system for the different kind of application or system task. An adaptive mechanism can be used to learn the behavior of the particular kind of file system or application and improve the layout on disk by matching the pre-allocation to the structure of the file system or application I/O pattern.

Figure 7:
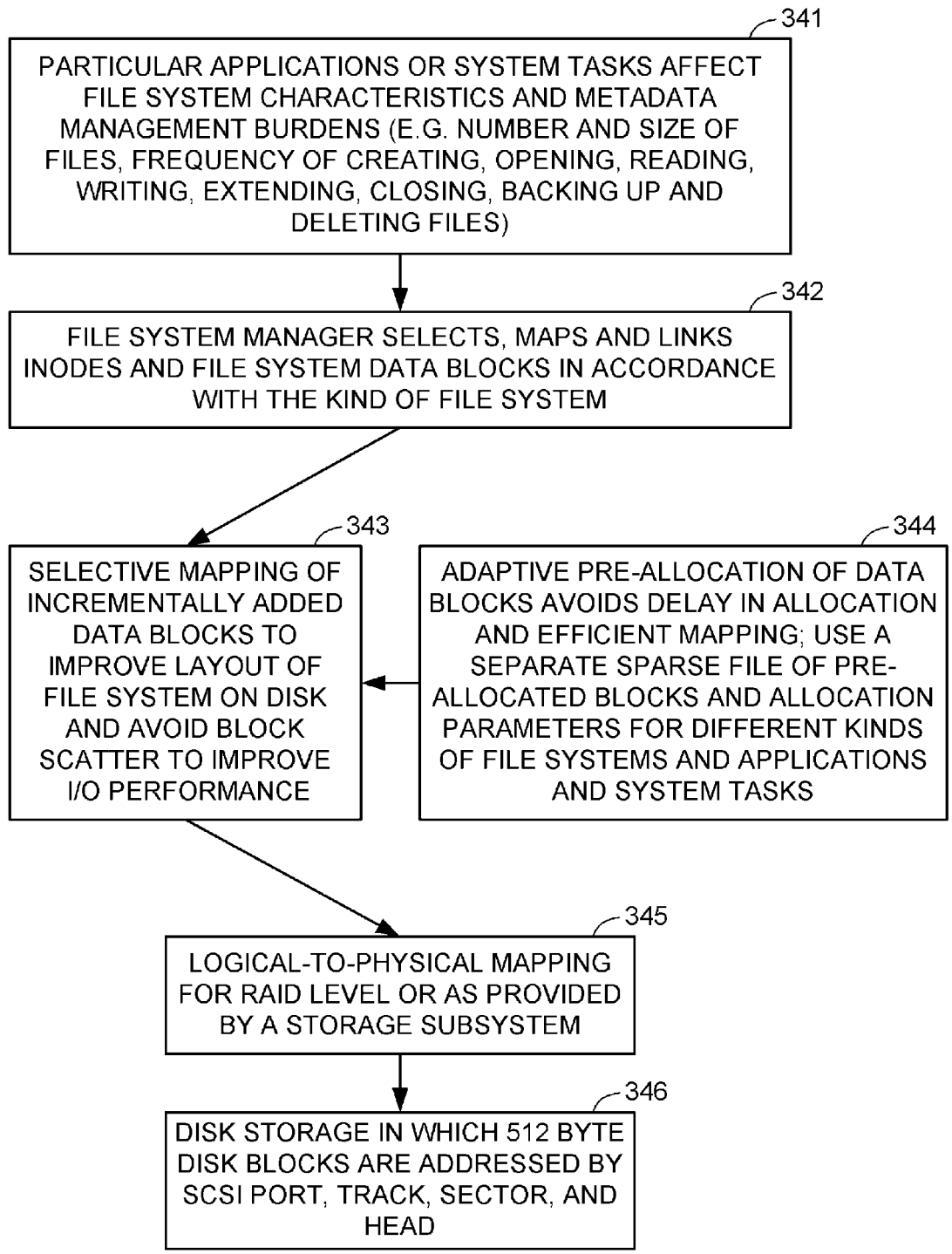
FIG. 7 shows a hierarchy of mapping that occurs in the data processing systems of FIG. 1 and FIG. 3.

FIG. 7 shows how block allocation and the adaptive mechanism are included in a hierarchy of data block mapping in the data processing system of FIG. 1 or FIG. 3. The mapping occurs in response to applications or systems accessing files in an uppermost level 341. For file systems dedicated to particular applications or system tasks, the number of the files in the file system and the sizes of the files in the file system may fall within a particular range or statistical distribution depending on the particular application or system task to which the file system is dedicated. The frequency of creating, opening, reading, writing, extending, closing, backing up, and deleting files results in the particular application or system task affecting the file system access characteristics and metadata management burden.

The file system access at the upper level 341 causes a file system manager at a next lower level 342 to select, map and link inodes and file system data blocks in accordance with the kind of file system being accessed. For example, for a UNIX-based file system, the inodes and file system data blocks are 8 K bytes in size. The file system manager accesses logical blocks, which are normally mapped to physical blocks at a lower level 345. The mapping at the lower level 345 is typically performed for a certain level of RAID redundancy or is performed in a storage subsystem such as a cached disk array. The mapping at the lower level 345 results in physical addresses for addressing disk storage at the bottom level 356. Typically each physical address specifies a SCSI port and a track, sector, and head for a disk block containing 512 bytes.

Selective mapping of incrementally added data blocks occurs at a level 343 between the level 342 of the file system manager and the level 345 of the logical-to-physical mapping. The selective mapping at the level 343 is performed to improve layout of the file system on disk and avoid block scatter so as to improve I/O performance by reducing disk drive head excursions for typical access patterns of the applications and system tasks. Logical blocks that are accessed in a contiguous fashion when reading or writing to files should be mapped to contiguous physical blocks on disk.

The selection of the mapping to use at the level 343 is essentially a de-fragmentation process. The selected mapping is then programmed into the combination of the second CFS layer 241 and the second VFS layer 242 in FIG. 2, or into the combination of the second CFS layer 301 and the second VFS layer 302 in FIG. 4. However, the selected mapping could also be stored in a translation table. If relatively few block addresses would need to be re-mapped, the translation table could be in the form of a hash index. The hash lists would only need to include entries for logical blocks having a mapping that would be changed from the address mapping that normally would result from the file system manager level 342 and the logical-to-physical mapping level 345.

The selective mapping at the level 343 is performed in conjunction with a process 344 of adaptive pre-allocation of data blocks for avoiding delay in allocation and in the selection of the mapping to be used at level 343. For example, a respective sparse file in the pool file system and respective allocation parameters (such as the reserve threshold, release threshold, release timeout, and pre-allocation chunk size) are provided for different kinds of file systems and applications and system tasks.

Figure 8:
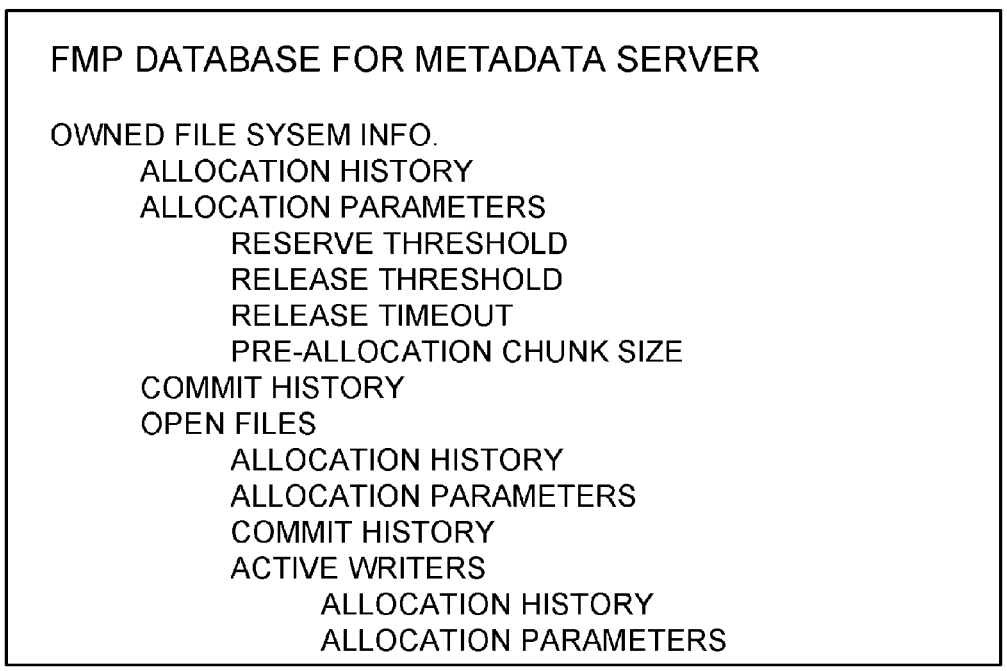
FIG. 8 shows a database storing information used for adaptive pre-allocation of data blocks to a file system.

For example, to begin building a new file system, the allocation server allocates an entire cylinder group of data blocks to the metadata server. The size of the cylinder group depends on the particular kind of file system. For example, a UNIX cylinder group contains 8,192 file system blocks, and each file system block contains 8 K bytes. When the metadata server requests additional blocks for this UNIX-based file system, the allocation server allocates an additional half cylinder group to the metadata server. Thus, as shown in FIG. 8, a history is kept of the allocation requests from each metadata server, including an identification of the file system for which additional data blocks are requested. This history can be kept in a FMP database for each metadata server. The database can be maintained by the FMP server in the allocation server or by the FMP client in the metadata server.

The FMP database of FIG. 8 may keep a history of commitment by each metadata server of data blocks to each on-disk file system owned by the metadata server. For example, in response to a request by the FMP client for additional data blocks for a file system owned by the metadata server, the FMP server of the storage allocation server checks if there were a prior commit of data blocks by the metadata server to the file system, and if there were such a prior commit and it were for a relatively large amount of data, such as 8 M bytes, then the allocation server would allocate the same amount of data to the metadata server. Therefore, once the FMP client and the FMP server have a history of the use of additional storage by the metadata server, the "chunk size" of allocated data blocks can be adjusted.

The FMP database of FIG. 8 may also keep a history of allocated blocks that are returned from a metadata server to the allocation server for a file system owned by the metadata server. For example, absent a change in conditions, such as a change in the amount of data in prior commits for the file system, the allocation server responds to a block allocation request by allocating the number of blocks that what was previously allocated for the file system minus what was returned for the file system.

Figure 9:
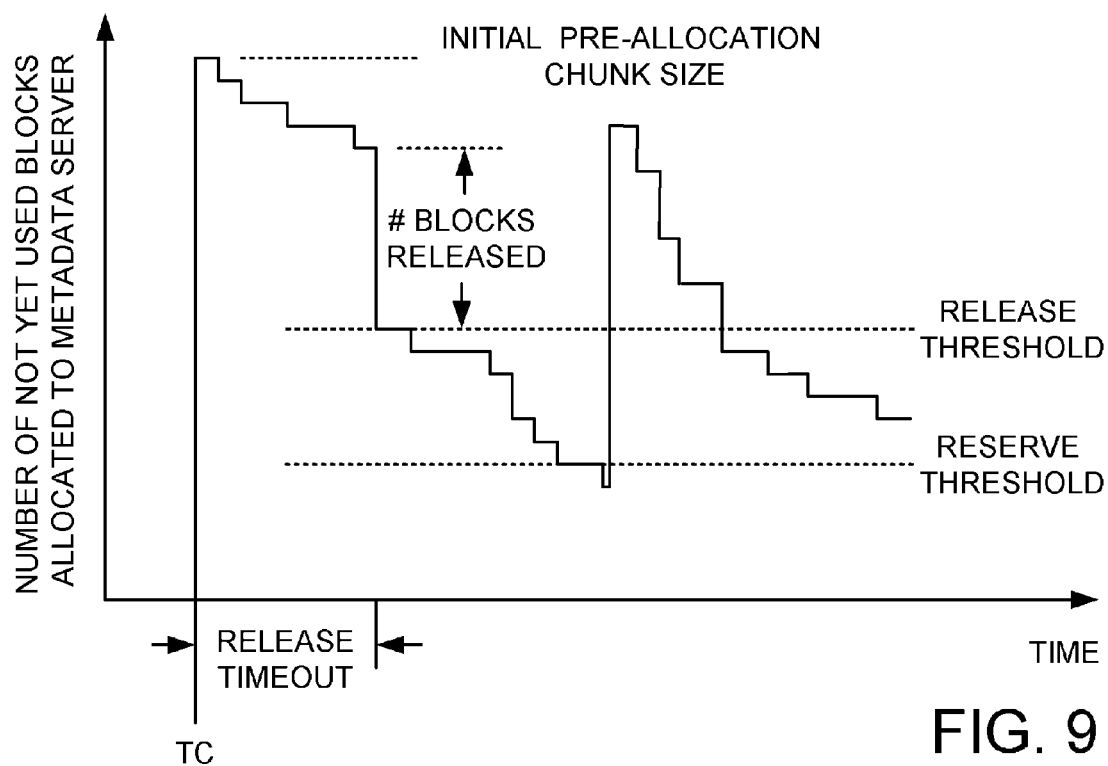
FIG. 9 shows a graph of the number of not yet used data blocks allocated to a metadata server as a function of time.

FIG. 9 shows a graph of the number of not yet used data blocks allocated to a metadata server as a function of time for use in a file system owned by the metadata server. At a time TC, the metadata server is allocated a number of not yet used data blocks equal to the initial pre-allocation chunk size. Upon expiration of the release timeout since the creation time TC, the metadata server releases the number of not yet used blocks in excess of the release threshold. Thereafter, as the pre-allocated blocks become committed to the file system, the number of not yet used blocks drops below the reserve threshold. Then, the metadata server is allocated another pre-allocation chunk having a number of blocks equal to the initial pre-allocation chunk size less the number of block that were released upon expiration of the release timeout.

Figure 10:
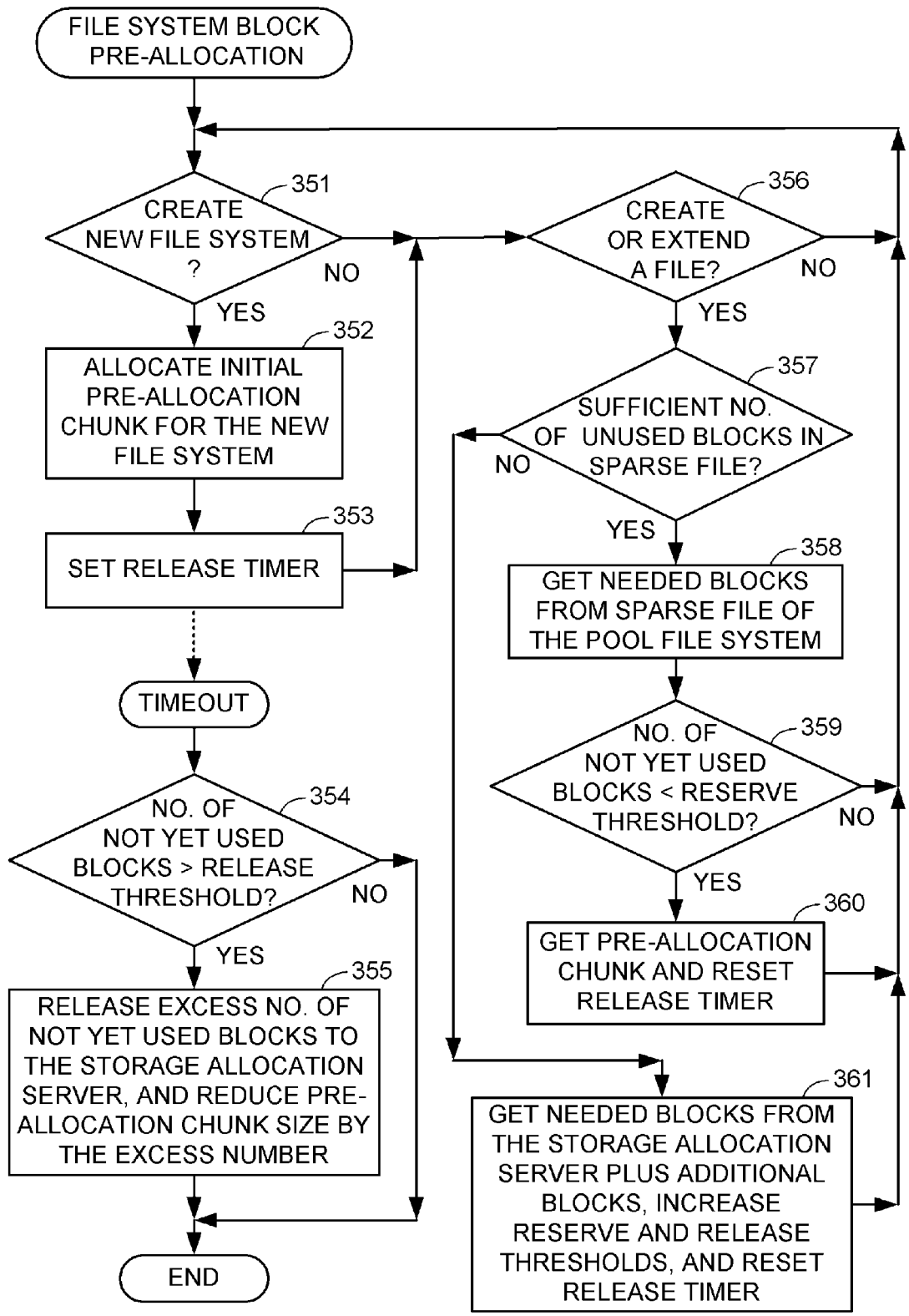
FIG. 10 is a flowchart of a procedure executed by a metadata server for pre-allocation of file system blocks.

FIG. 10 is a flowchart of a procedure executed by a metadata server for pre-allocation of file system blocks. In a first step 351, when a new file system is created, the storage allocation allocates an initial pre-allocation chunk to the metadata server for building the new file system. Then in step 353, a release timer is set. Upon expiration of the release timer, execution continues to step 354 of a timer interrupt service routine. In step 354, the number of not yet used blocks in the sparse file of the pool file system for the new file system is compared to the release threshold. If the release threshold is not exceeded, then the timer interrupt service routine ends. Otherwise, execution continues to step 355. In step 355 the excess number of not yet used blocks is released to the storage allocation server, and the pre-allocation chunk size is reduced by the excess number.

If in step 351a new file system is not needed and after step 353, execution continues to step 356. In step 356, if a file is not to be created or extended, then execution loops back to step 351. Otherwise, execution continues to step 357. In step 357, if the sparse file for the file system has a sufficient number of not yet used blocks for creating or extending the file, then execution continues to step 358 to get these needed blocks from the sparse file, link them into the file system or file, and commit them to the on-disk file system. (This involves updating the pool file system map so that blocks are no longer indicated as "not yet used", for example by updating the pool file system map to remove the blocks from a list of offset/range of not yet used blocks.) In step 359, if the number of not yet used blocks in the sparse file is not less than the reserve threshold, then execution loops back to step 351. Otherwise, execution continues to step 360 to get a pre-allocation chunk of blocks from the storage allocation server and to reset the release timer. After step 360, execution loops back to step 351.

In step 357, if there is not a sufficient number of not yet used blocks in the sparse file, then execution branches to step 361. In step 361, the needed blocks are obtained from the storage allocation server, plus additional blocks, the reserve and release thresholds are increased, and the release timer is reset. For example, the reserve threshold and the release threshold are increased by a fraction of the number of blocks that are needed less the number of not yet used blocks in the sparse file, and the number of blocks obtained in step 361 includes a sufficient number of pre-allocation chunks to exceed the number of blocks that are needed less the number of not yet used blocks in the sparse file plus the updated release threshold. After step 361, execution loop back to step 351.

The selective decreasing of the allocation chunk size in step 355 and increasing of the reserve and release thresholds in step 361 provides fast adaptation to an over supply and under supply of not yet used blocks. The allocation chunk size and the reserve and release thresholds should be brought back slowly to their initial default values. These initial default values themselves can be adjusted more slowly based on the allocation history, for example, in order to maintain a desired relationship of the pre-allocation chunk size, release threshold, and reserve threshold with respect to statistics of the number of not yet used blocks allocated to the metadata server, as generally shown in FIG. 9.

Typically when a file is created in an UxFS file system, there is a default initial file allocation. For example, for a file created in response to a NFS request from a network client, the initial default size is 32 file system blocks of 8 K bytes per block. It is preferred for the metadata server to initially allocate a chunk of blocks that is a multiple of the initial default size, such as 64 times the initial default size, although the multiple could be selected based on the particular application that is requesting the file to be created (for example, as indicated by a file name extension identifying a file type). Blocks pre-allocated to the file in excess of a release threshold could be returned to the sparse file of the pool file system after a release timeout interval following the creation of the file. The multiple blocks should be contiguous on disk to the extent reasonably possible, and the additional blocks in each chunk should be reserved for extending the file. Thus, there should be a pre-allocation of physically contiguous disk blocks to files at least for applications that are expected to extend the files after the files are created and initially written to.

FIG. 11 shows graphically the desired relationship between the logical and physical addresses and disk placement of file system data blocks (shown in cross-hatch in the storage array 256) that have been allocated to a file and committed to the file system, and file system data blocks (shown in dashed cross-hatch in the storage array 256) that have been pre-allocated to the file and not yet committed to the file system. The blocks that have been allocated to the file and committed to the file system have contiguous logical addresses that range from A1 to A2-1, and contiguous physical track addresses that range from T1 to T2-1, and the blocks that have been pre-allocated and not yet committed to the file system have contiguous logical addresses that range from A2 to A3-1 and contiguous physical track addresses that range from T2 to T3-1. Each file system data block includes bytes of data that are striped across a number of disk drives 271, 272, 273, 274 in the storage array 256.

For file systems and applications permitting multiple writers (e.g., application processes or system processes) to write to a sparse file, it may also be desirable to retain a history of where each writer has been writing to the file and how much data has been allocated to each writer in order to pre-allocate physically contiguous file system data blocks for each writer to continue writing in a logically contiguous fashion.

FIG. 12, for example, shows logical addresses for such a sparse file include a contiguous range of addresses A1 to A2-1 for data blocks allocated to a first writer immediately followed by a contiguous range of addresses A2 to A3-1 for data blocks pre-allocated to the first writer, followed by a hole (i.e., no data blocks allocated or pre-allocated for logical addresses A3 to A4-1), followed by a contiguous range of addresses A4 to A5-1 for data blocks allocated to a second writer immediately followed by a contiguous range of addresses A5 to A6-1 for data blocks pre-allocated to the second writer.

To support a sparse file as shown in FIG. 12, the thin provisioning module (246 in FIG. 2 or 306 in FIG. 4) maintains a separate map of the pre-allocated blocks in the file, and can move the block indications in this map to the map of allocated blocks in the file if and when a writer writes to the file. The thin provisioning module may release the pre-allocated storage when need by other writers or for other purposes, and when the file is closed by all writers. Depending on the application or system task, or depending on attributes of the sparse file, the thin provisioning module may also release the storage pre-allocated to the file for a particular writer when that writer closes its access to the file, even though the file may be open to other writers. The thin provisioning module could also respond to calls from an application or system process to release the storage pre-allocated in the sparse file for that application or system process, or to change the amount of data blocks that should be pre-allocated to the file for the application or system process.

A storage allocation server can also be programmed to function as a primary server for managing metadata of a production dataset and snapshot copies of the production dataset while delegating to a secondary storage server the read-write access to the production dataset. This can be done in such a way that most of the management of the snapshot metadata can be done "out of band" with respect to the read-write access to the production dataset. Therefore the I/O performance of the secondary storage server is not reduced very much by the snapshot copy process.

Figure 13:
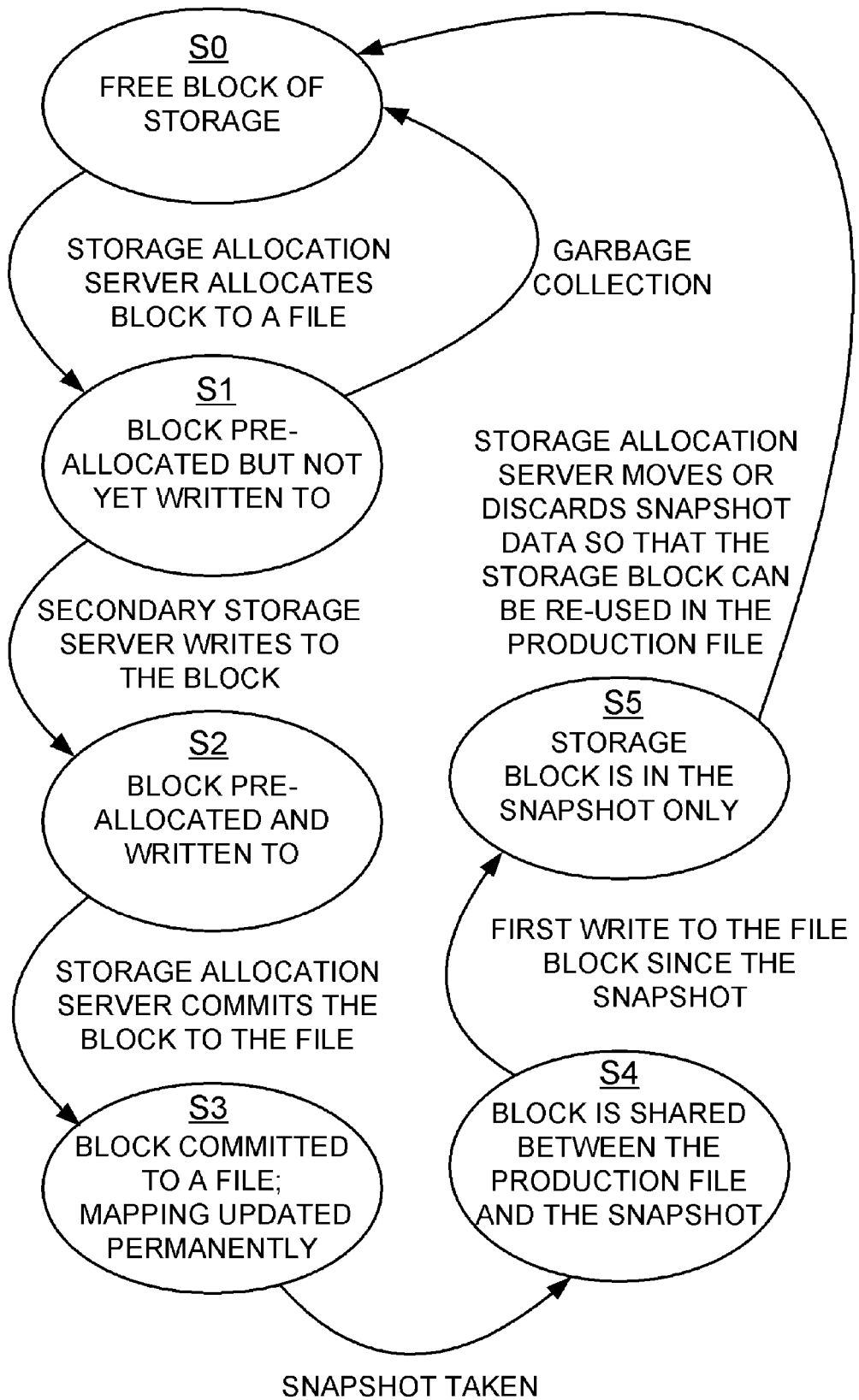
FIG. 13 is a diagram of possible states of a block of storage initially used as a data block in a production file and later used in a snapshot copy produced from the production file by a "write anywhere" method.

FIG. 13 shows possible states of a block of storage initially used as a data block in a production file and later used in a snapshot copy produced from the production file by a preferred "write anywhere" method used in a primary storage allocation server and a secondary storage server. In an initial state S0, the block is a free block of storage. The block transitions to a next state S1 when the storage allocation server allocates the block to a file. In state S1, the block is pre-allocated but not yet written to. The block transitions to a next state S2 when the secondary storage server writes to the block. In state S2, the block is pre-allocated and written to. The block transitions to a next state S3 when the storage allocation server commits the block to a file. In this state, the mapping of the file has been updated in storage to indicate that the block is included in the file.

The block transitions to a next state S4 when a snapshot is taken. In state S4, the block is shared between the production file and the most recent snapshot copy of the production file. The block transitions to a next state S5 when the storage server performs a first write to the block since the most recent snapshot of the production file. In state S5, the storage block is in the snapshot copy only and is no longer in the production file. The new data for the file block is not stored in this storage block and instead is stored in another storage block that has been pre-allocated to the file. The storage block in state S5 remains in state S5 until the storage allocation server moves or discards the snapshot copy data from the storage block. Because the storage block is co-located with other storage blocks of the file, it often is desirable for the storage allocation server to move or discard snapshot data in order to pre-allocate the storage block for re-use in the file. In this case, the block transitions from state S5 back to state S0, and then once again to state S1 after the appropriate allocation operation.

Figure 14:
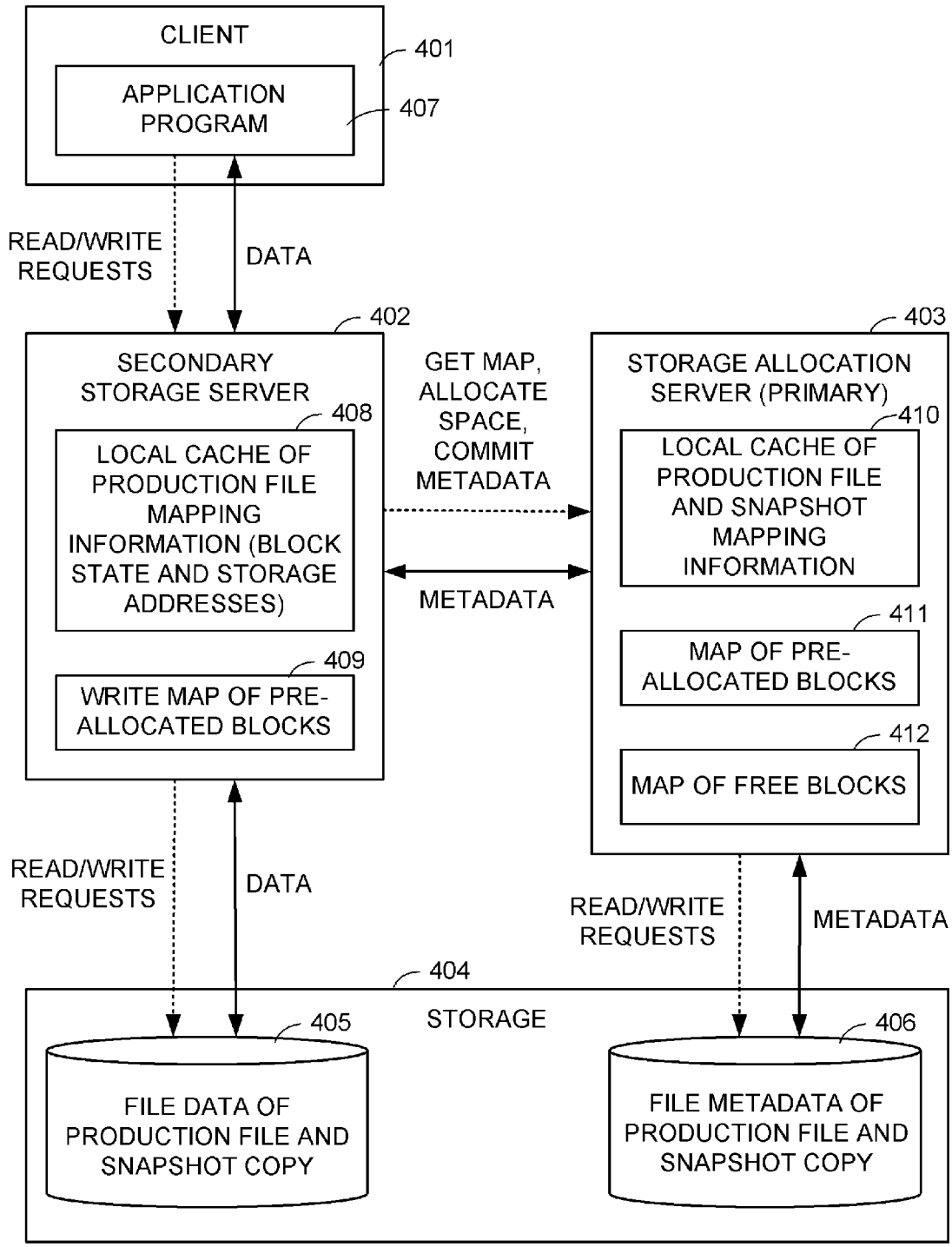
FIG. 14 is a block diagram of a data processing system in which a storage allocation server is also programmed as a primary server for managing metadata of a production file and maintaining snapshot copies the production file, and for delegating, to one or more secondary storage servers, read-write access to the production file concurrent with the maintenance of the snapshot copies, including the sharing of file blocks between the production file and the snapshot copies.

FIG. 14 shows a data processing system including a client 401, a secondary storage server 402, a primary storage allocation server 403, and storage 404. The storage allocation server 403 is programmed as a primary server for managing metadata of a production file and maintaining snapshot copies the production file, and for delegating, to the secondary storage server 402, read-write access to the production file concurrent with the maintenance of the snapshot copies, including the sharing of file blocks between the production file and the snapshot copies. In this example, the storage allocation server retains exclusive responsibility for updating inode block maps and bits indicating file blocks that have been first written to since the time of the snapshot. This example more specifically involves a write anywhere upon the first write of a file block since the time of creation of the last snapshot of the production file. After the first write of the file block since the time of creation of the last snapshot of the production file, subsequent writes to this same file block will write to the same storage location as the first write, until a next snapshot of the production file is taken.

For example, to create a "write anywhere" snapshot of a file, the file's metadata is made "read-only." Then the inode of the file is cloned to create a production file inode and a snapshot file inode. Initially, the indirect block tree of the file is linked to both of these inodes. When new data is first written to a block of the production file since the time of the snapshot, the new data is written to a newly allocated block, and the block pointer to the original data block is changed in the production file inode so that it points to the newly allocated block, and one bit in this block pointer indicates that this block has been written to since the time of the snapshot. For keeping a chronological series of snapshots of the file, this one bit is more generally used as an ownership bit indicating whether or not the data of the pointed-to data block changed prior to the time of the snapshot and after the time of the next oldest snapshot. Further details regarding this procedure of creating and maintaining write-anywhere snapshots of a file are found in Bixby et al., U.S. patent application Pub. No. 2005/0065986 published Mar. 24, 2005 entitled "Maintenance of a File Version Set Including Read-Only and Read-Write Snapshot Copies of a Production File," incorporated herein by reference.

The secondary storage server 402 receives read/write requests and data from an application program 407 executed by the client 401. The production file itself can be a container for a UxFS file system that is accessed by the application program 407. In this case, the logical extent of the production file serves as a logical volume upon which the UxFS file system is built. By using a single production file as a container for a UxFS file system, it is possible for a conventional backup, migration, or replication program to perform a single backup, migration, or replication upon an entire UxFS file system including multiple files. The container file serves as a convenient package for the multiple files, and the attributes of the container file will indicate when the version of the UxFS file system in the container file was created and last accessed. Further details regarding the use of a file as a logical volume for a UxFS file system are found in Virendra M. Mane, "File Based Volumes and File Systems," U.S. patent application Ser. No. 11/301,975 filed Dec. 13, 2005, incorporated herein by reference.

The secondary storage server 402 has a local cache 408 of production file mapping information. This production file mapping information includes respective storage addresses for file blocks, and also block state information indicating whether or not each production file block in local cache 408 is either in a "READ-ONLY" state or a "READ-WRITE" state. A respective flag can be used to indicate the state of each file block in the local cache, or the local cache can be subdivided into a list of "READ-ONLY" blocks and a list of "READ-WRITE" blocks. For example, when a snapshot is taken, the state of each of the production file blocks in the local cache is set to "READ-ONLY" because each block is then shared between the production file and this most recent snapshot until a write to the block occurs. The secondary storage server 402 also has a write map 409 of blocks that have been pre-allocated to the production file.

At any particular time, the local cache 408 and the write map 409 need not include mapping information for all of the blocks in the file. Typically the local cache 408 and write map 409 are initially empty. From an initially empty state, the local cache 408 of production file mapping information becomes filled in response to read or write requests from the application program 407. When production file mapping information is needed for responding to a read request, the secondary storage server 402 sends a "Get Map" request to the storage allocation server 403, and the storage allocation server returns the requested production file mapping information.

From an initially empty state, mapping information about pre-allocated blocks is added to the write map 409 in response to write requests from the application program 407 for the first writes to file blocks since the last snapshot. When mapping information about a pre-allocated block is needed for responding to a write request, the secondary storage server 402 sends an "Allocate Space" request to the storage allocation server 403, and the storage allocation server returns the requested mapping information. The secondary storage server 402, however, may request or the storage allocation server 403 may provide mapping information about more blocks than needed for one write operation. For example, blocks may be pre-allocated in response to an explicit request from the application program to fill holes in the file or to extend the file.

In a similar fashion, the storage allocation server 403 has a local cache 410 of production file and snapshot mapping information, and a local map 411 of pre-allocated blocks. The local cache 410 of production file and snapshot mapping information is used to maintain an in-cache file system including the production file and its snapshots, corresponding to an on-disk file system of file metadata 406 in the storage 404. The local map 411 of pre-allocated blocks permits the storage allocation server to pre-allocate selected storage blocks to particular offsets in the production file well in advance of receipt of "Allocate Space" requests for the selected storage blocks. In this case, the local map 411 may include an indication of whether or not the metadata information for the pre-allocated blocks has been sent to a secondary storage server, and if so, an identification of the secondary storage server.

The secondary storage server 402 sends read/write requests to disk storage 405 in order to read or write data of the production file. For a first write to a file block since the last snapshot, the block mapping information for the file block must also be changed in the metadata of the file, since new data for the file block is written to a new storage block. The secondary storage server 402 not only changes the state of the file block from "READ-ONLY" to "READ-WRITE" in its local cache 408 but also changes the mapping information for the file block in the cache by removing the new mapping information for the file block from the write map 409 and writing it into the local cache 408. The secondary storage server 402 also sends a "Commit Metadata" request to the storage allocation server 403 so that the storage allocation server commits this change in mapping information to on-disk file metadata in disk storage 406.

In a preferred implementation, the disk storage 405 containing the file data is partitioned from the disk storage 406 containing the file metadata, and the storage server 402 does not have the right to directly access the file metadata in the disk storage 406. This helps to maintain the integrity of the file metadata.

Figure 15:
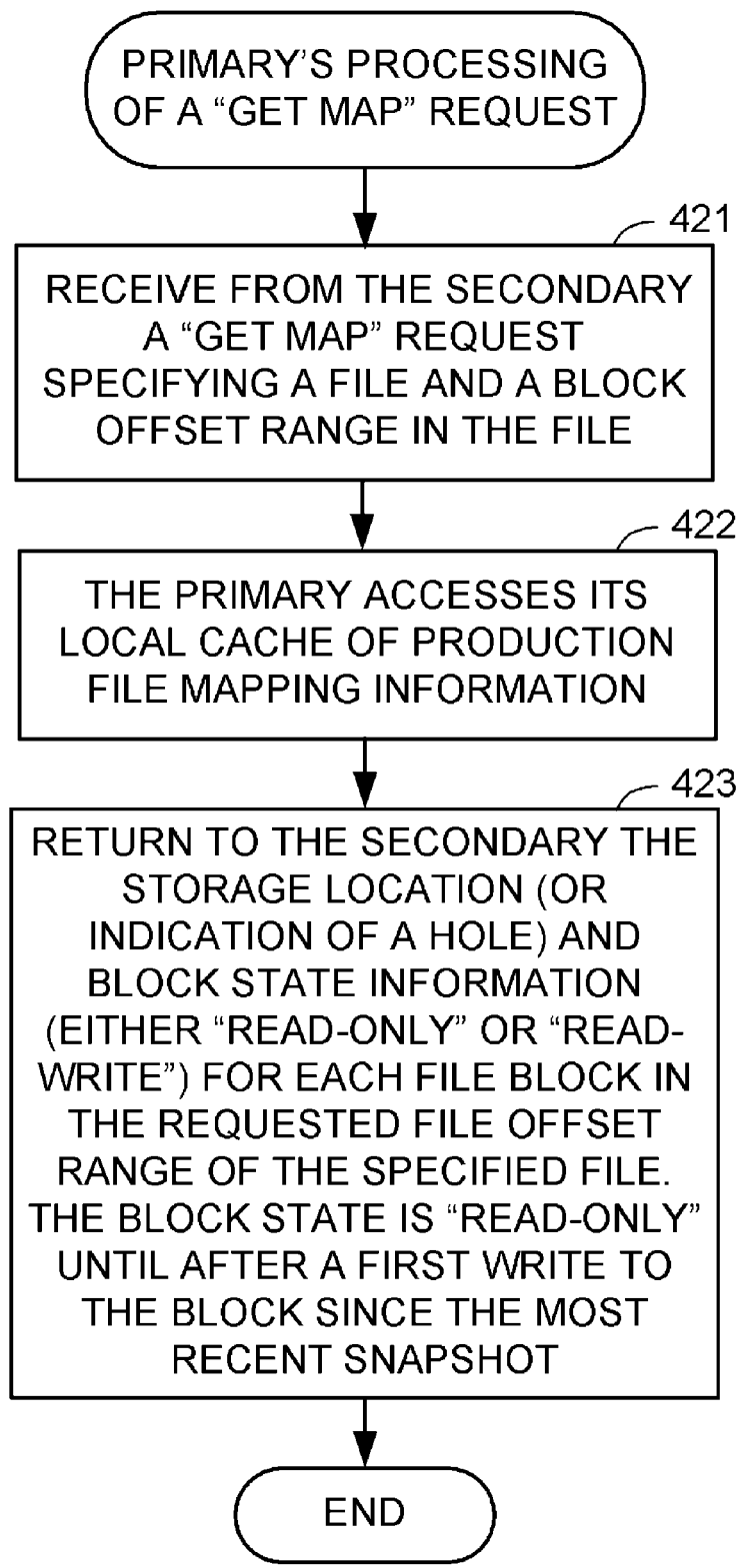
FIG. 15 is a flow chart of the processing of a "Get Map" request by the storage allocation server in FIG. 14.

As shown in FIG. 15, in a preferred implementation, the "Get Map" request specifies a file and a range of logical blocks in the file. Upon receipt of the request (step 421), if the secondary storage server is authorized to access the file, then (in step 422) the storage allocation server accesses its local cache of production file mapping information (410 in FIG. 14). If the requested mapping information is not initially found in this local cache, then the storage allocation server fetches the requested mapping information from the on-disk file metadata (406 in FIG. 14) and puts the requested mapping information into the local cache. In step 423, the storage allocation server returns the storage location (or an indication that the block is a hole in the file) and block state information of each logical block in the range. The storage location could be a logical block address in a cached disk array, or a storage area network address. The state is either "READ-ONLY" or "READ-WRITE." The block state is "READ-ONLY" until after a first write to the block since the most recent snapshot. If the storage location is a hole in the file, then the block state is "READ-ONLY."

For example, the state and the storage location of each logical block in the range is returned in a list format, in which the state and the storage location is returned for the first block in the range, and for successive blocks in the range the block number, state, and storage location is returned only if there is a change in state or a change in storage location (other than a change in storage location offset not directly proportional to the offset of the block in the file). In particular, the list is a series of table entries ordered by the block offset in the file, and each entry includes a beginning block offset in the file, an ending block offset in the file, the state of the blocks from the beginning block offset to the ending block offset, and the address of the storage location for the beginning block offset for the file (or an indication that the beginning block offset is in a hole in the file). The secondary may cache the list by converting and linking the table entries into the index structure of the file system used in the secondary storage server, such as linking the table entries to the file inode or indirect block tree structure used in a Unix-based file system.

Figure 16:
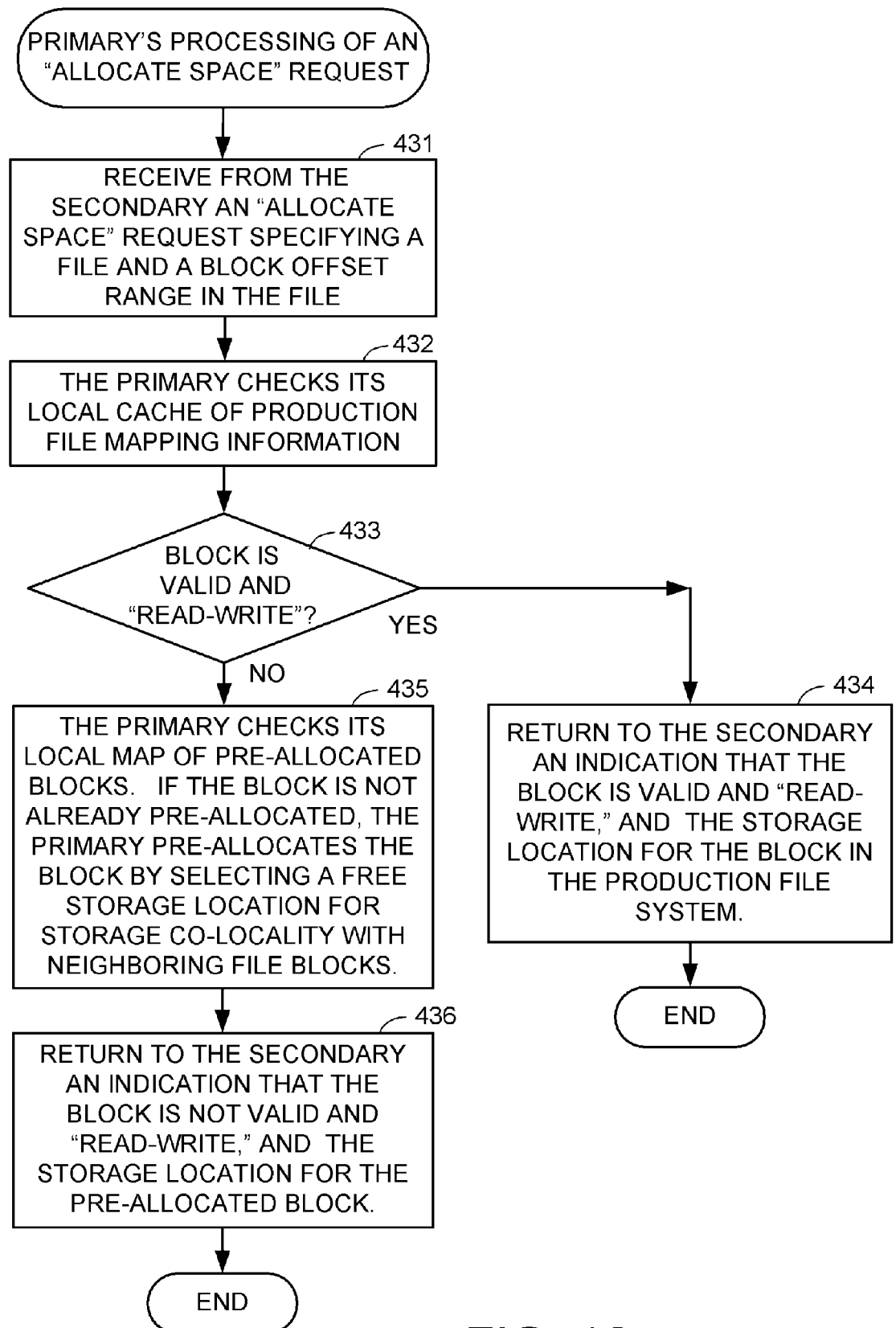
FIG. 16 is a flow chart of the processing of an "Allocate Space" request by the storage allocation server in FIG. 14.

As shown in FIG. 16, in a preferred implementation, the "Allocate Space" request also specifies a file and a range of logical blocks in the file. Upon receipt of the request (step 431), if the secondary storage server is authorized to access the file, then (in step 432) the storage allocation server checks its local cache of production file mapping information to determine whether or not each block in the specified range is valid (i.e., whether it presently is in the production file), and if so, whether it is "READ-WRITE". For each block that is valid and "READ-WRITE," then execution branches from step 433 to step 434. In step 434, the storage allocation server returns to the secondary storage server an indication that the block is valid and "READ-WRITE," and the storage location for the block in the production file system, and processing of the "Allocate Space" request is finished with respect to the block.

In step 433, for each block that is not valid or valid but "READ-ONLY", then execution continues to step 435. In step 435, the storage allocation server checks its map of pre-allocated blocks. If the block is not already pre-allocated, then the storage allocation server allocates the block by selecting a free storage location for co-locality with neighboring blocks of the production file. Then in step 436, the storage allocation server returns to the secondary storage server an indication that the block is not valid and "READ-WRITE," and the storage location for the pre-allocated block, and processing of the "Allocate Space" request is finished with respect to the block.

For a file having a high degree of write activity, the storage allocation server can use a storage intensive method of pre-allocation in order to achieve co-locality of the pre-allocated storage with the shared storage having the same or neighboring block offsets in the file. For example, the storage allocation server could initially pair neighboring storage blocks having alternate sectors or tracks, and when a storage block is first committed, its pared storage block could be mapped to the same file and block offset in the file and placed in the storage allocation server's map 411 of pre-allocated blocks. Once a storage block becomes only in a snapshot (i.e., transitions to state S5 in FIG. 13), the storage allocation server then moves the snapshot data to entirely separate storage (such as slower and lower-cost secondary storage) so that the storage block can retain the same offset in the file and again be pre-allocated.

Figure 17:
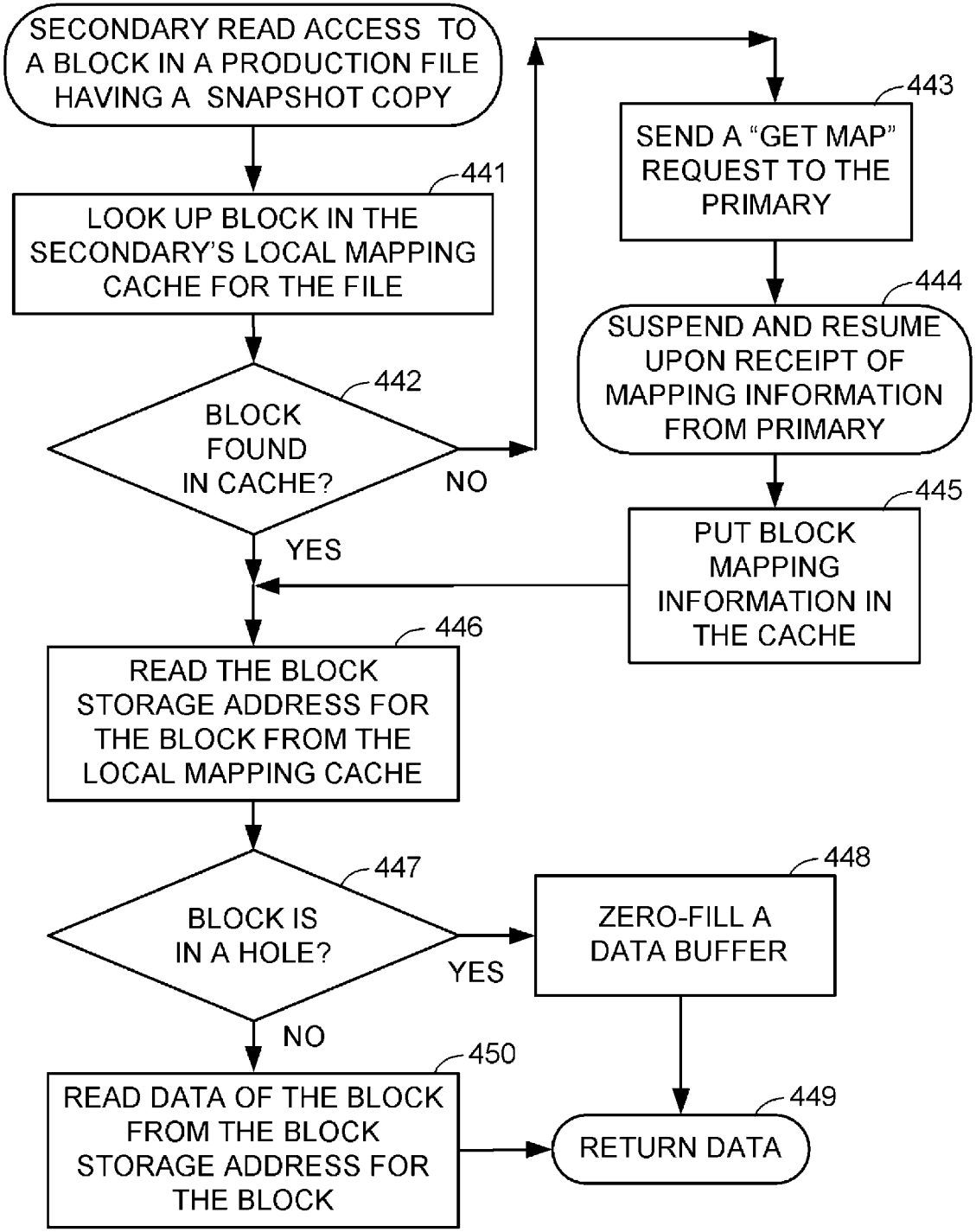
FIG. 17 is a flow chart of read access to a block in the production file by the secondary storage server in FIG. 14.

FIG. 17 shows read access to a block in the production file by the secondary storage server in FIG. 14. In a first step 441, the secondary storage server looks up the block in its local mapping cache for the production file. Then in step 442, execution branches to step 443 if the block is not found in the local cache. In step 443, the secondary storage server sends a "get map" request to the storage allocation server. In step 444, the secondary storage server suspends processing of the read request, and resumes upon receipt of the requested mapping information from the storage allocation server. In step 445, the secondary storage server puts the block mapping information into its local cache. Execution continues from step 445 to step 446. Execution also continues from step 442 to step 446 if the block is found in the local cache. In step 446, the secondary storage server reads the block storage address for the block from its local mapping cache. In step 447, if the block is a hole in the file, then execution branches to step 448. In step 448, the secondary storage server zero-fills a data buffer and in step 449 returns the data of the data buffer to the application or system process having requested the data.

In step 447, if the block is not a hole in the file, then execution continues to step 450. In step 450, the secondary storage server reads data of the block from the block storage address for the block. Then in step 449, the secondary storage server returns the data of the block to the application or system process having requested the data.

Figure 18:
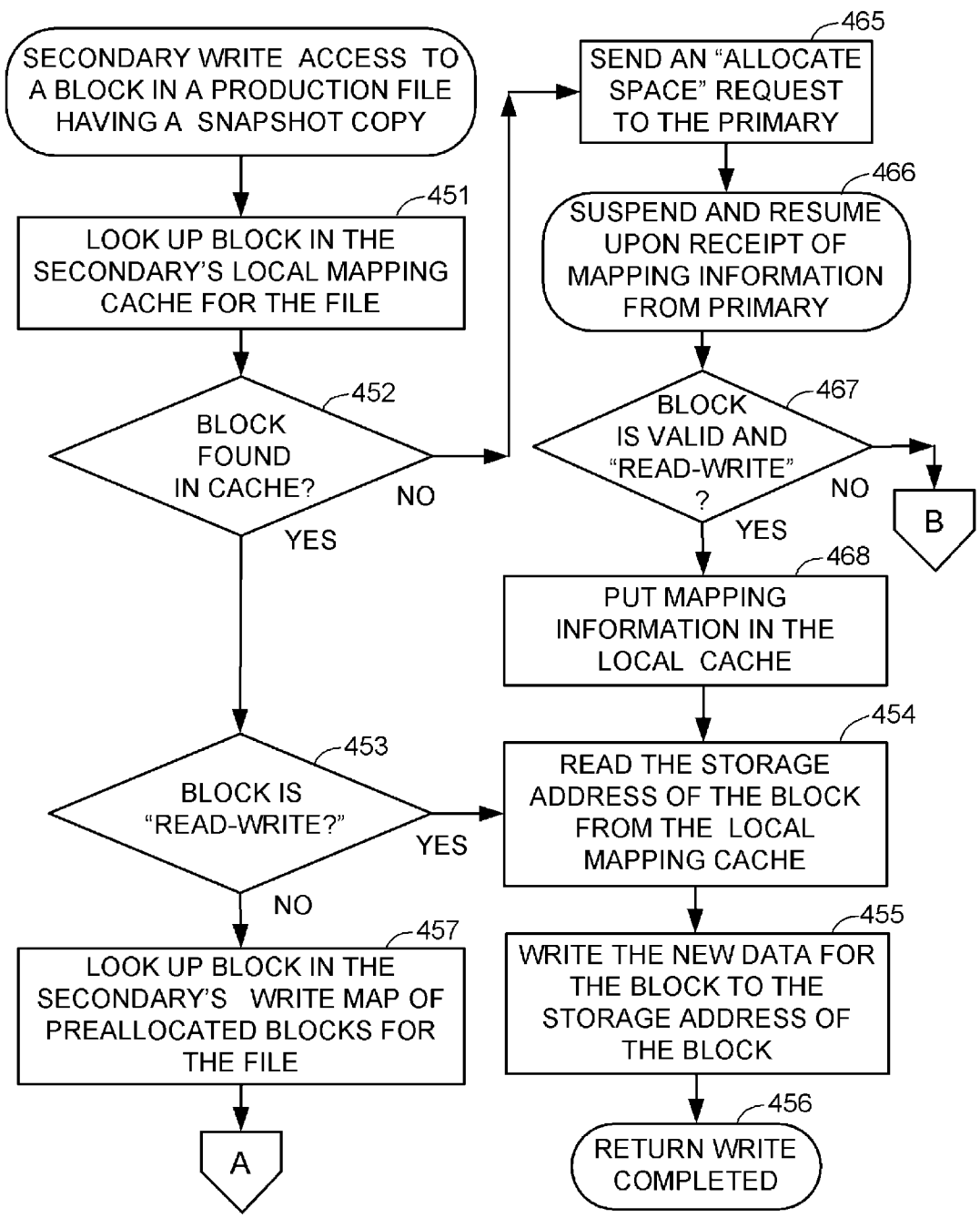
FIGS. 18 and 19 together comprise a flow chart of write access to a block in the production file by the secondary storage server in FIG. 14.
Figure 19:
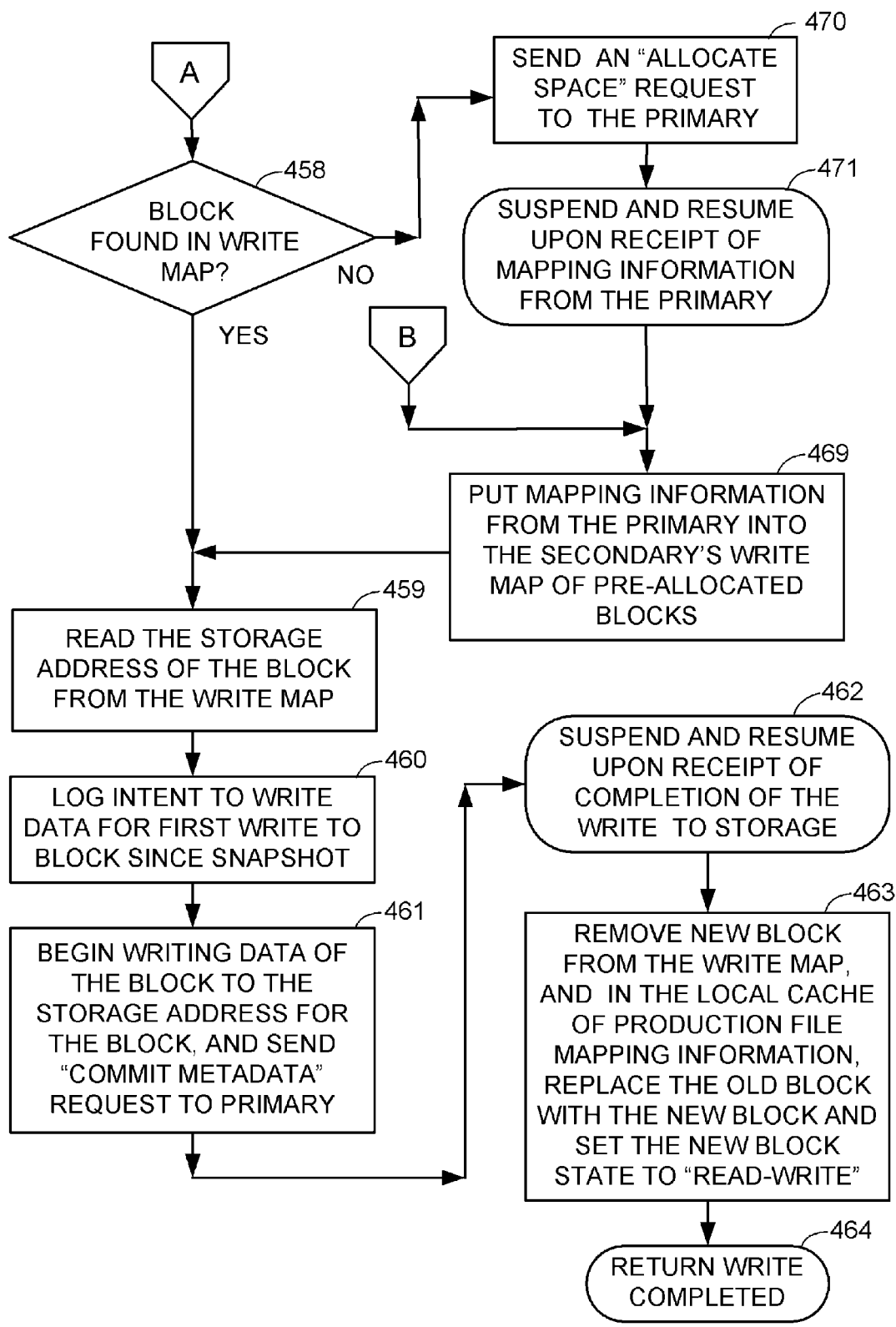

FIGS. 18 and 19 show write access to a block in the production file by the secondary storage server. In a first step 451, the secondary storage server looks up the block in its local mapping cache for the file. Then in step 452, if the block is found in the cache, then execution branches to step 453. In step 453, execution branches to step 454 if the state of the block in the local mapping cache is "READ-WRITE." In step 454, the secondary storage server reads the block storage address for the block from the local mapping cache. In step 455, the secondary storage server writes the new data for the block to the storage address of the block. Then in step 456, the storage allocation server returns a "write completed" acknowledgement to the application or system process that had requested the write operation.

In step 453, if the state of the block in the secondary storage server's local mapping cache is not "READ-WRITE," then the state is "READ-ONLY," and execution continues to step 457. In step 457, the secondary storage server looks up the block in its local write map of pre-allocated blocks for the file. Execution continues from step 457 to step 458 of FIG. 19. In step 458, if the block is not found in the write map, then execution continues to step 459.

In step 459, the secondary storage server reads the storage address of the block from the write map. In step 460, the secondary storage server logs an intent to write data for a first write to the block since the snapshot. The log entry includes the offset of the block in the file and its new storage address from the write map, in order to assist recovery in the event of a system crash. Then in step 461 the secondary storage server begins writing the new data of the block to the storage address for the block, and also sends a "commit metadata" request to the storage allocation server. In step 462, the secondary storage server suspends processing of the write operation, and resumes upon completion of the write of the new data of the bock to storage. In step 463, the storage allocation server removes the new block from the write map, and in the secondary storage server's local cache of production file mapping information, replaces the storage address of the old block with the storage address of the new block and sets the new block state to "READ-WRITE." Finally, in step 464, the secondary storage server returns a write completed acknowledgement to the application or system process that requested the write operation.

Because the "intent to write" has been logged in step 460, it is not necessary for the secondary storage server to wait for the storage allocation server to commit the new metadata before returning a "write completed" acknowledgement to the application or system process that requested the write operation. Moreover, for more efficient transmission of requests to the storage allocation server, the secondary storage server can bunch up multiple "commit metadata" requests and send them all together to the storage allocation server. However, the secondary storage server should wait for the storage allocation server to complete all outstanding "commit metadata" requests for an application or system process when the application or system process requests the file to be closed or requests the "in cache" file system to be flushed to storage.

In step 452 of FIG. 18, if the block is not found in the secondary storage server's local mapping cache for the file, then execution branches to steps 465. In step 465, the secondary storage server sends an "Allocate Space" request to the primary allocation server for mapping information needed for writing to the block. In step 466, the secondary storage server suspends processing of the block write operation, and resumes upon receipt of the requested mapping information for the block. In step 467, the secondary storage server looks at block state information returned from the primary allocation server. If the state of the block is valid and "READ-WRITE," then execution continues from step 467 to step 468. In step 468, the secondary storage server puts the mapping information for the block into its local cache. Execution continues from step 468 to step 454 so that in step 455 the new data for the block is written to the storage address for the block.

In step 467 of FIG. 18, if the state of the block is not valid and "READ-WRITE," then execution branches from step 467 to step 469 in FIG. 19. In step 469, since the state of the block is not valid and "READ-WRITE," the mapping information returned from the primary allocation server is mapping information for a pre-allocated block. Therefore, in step 469 the secondary storage server puts this mapping information from the primary into the secondary's write map of pre-allocated blocks. Execution continues to step 459 so that in step 461 new data for the block is written to the storage address for the pre-allocated block.

In step 458 of FIG. 19, if the block is not found in the write map, then execution branches to step 470. In step 470, the secondary storage server sends an "Allocate Space" request to the primary storage allocation server. In step 471, the secondary storage server suspends and resumes processing of the write request upon receipt of mapping information from the primary allocation server. In this case, this mapping information is a storage address for a pre-allocated block. Therefore, execution continues to step 469. In step 469, this mapping information from the primary is put into the secondary's write map of pre-allocated blocks. Execution continues to step 459 so that in step 461 new data for the block is written to the storage address for the pre-allocated block.

Figure 20:
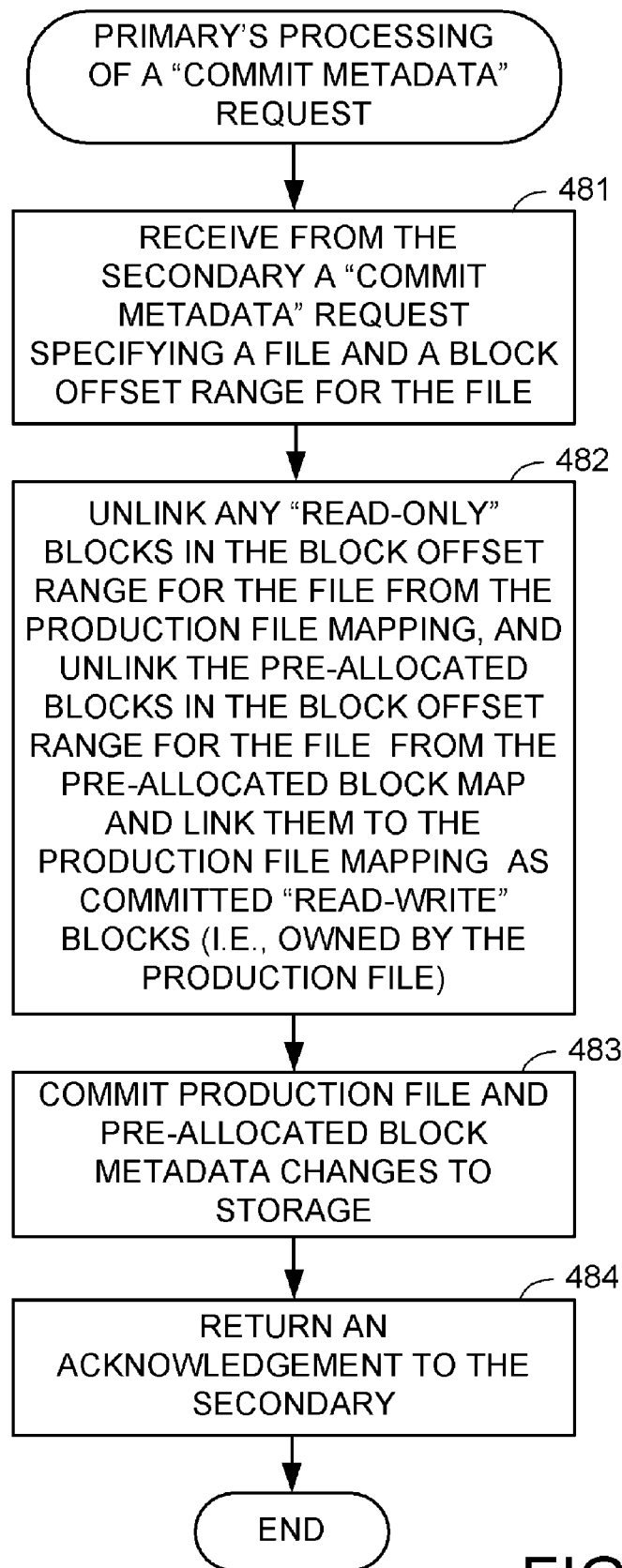
FIG. 20 is a flow chart of the processing of a "Commit Metadata" request by the storage allocation server in FIG. 14.

FIG. 20 shows processing of a "Commit Metadata" request by the storage allocation server. In a first step 481, the storage allocation server receives from the secondary storage server a "Commit Metadata" request specifying a file and a block offset range for the file. The block offset range for the file may include file block addresses that are already in the file and file block addresses that are not yet in the file. The file block addresses that are already in the file should be file block addresses of "READ-ONLY" blocks of old file data in the file and also file block addresses of corresponding pre-allocated blocks of new file data for the file. The file block addresses that are not yet in the file should be file block addresses of pre-allocated blocks to be added to the file.

In step 482, the storage allocation server unlinks any "READ-ONLY" blocks in the block offset range for the file from the production file mapping. These "READ-ONLY" blocks remain linked to the most recent snapshot file mapping so that they become owned by the most recent snapshot. Also, the storage allocation server unlinks the pre-allocated blocks in the block offset range in the file from the storage allocation server's local map of pre-allocated blocks, and links them to the production file mapping as committed "READ-WRITE" blocks (i.e., owned by the production file). In step 483, the storage allocation server commits the production file and pre-allocated block metadata changes to the file metadata in storage (406 in FIG. 14). Finally, in step 484, the storage allocation server returns an acknowledgement of the metadata commit to the secondary storage server.

Figure 21:
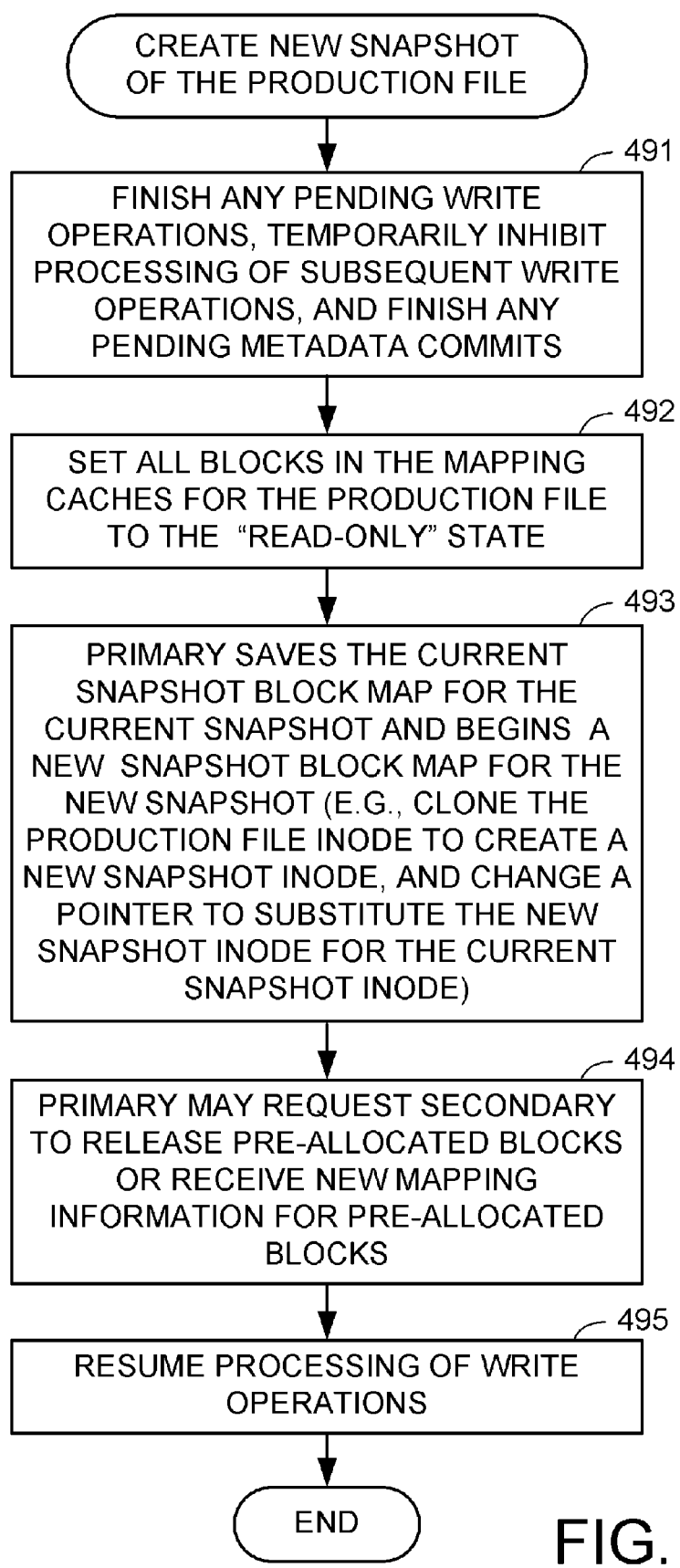
FIG. 21 is a flow chart of a procedure for creating a new snapshot of the production file in the data processing system of FIG. 14.

FIG. 21 shows a procedure for creating a new snapshot copy of the production file. In step 491 the secondary storage server is requested to finish any pending write operations upon the production file and to temporarily inhibit the processing of any subsequent write operations upon the production file, and the storage allocation server finishes any pending metadata commits. For example, the storage allocation server receives a request to create the snapshot copy from a system administrator or from a system program that produces the request on a periodic basis or when the number of storage blocks in the last snapshot only reaches a preset number. The storage allocation server determines the secondary storage server presently having a read-write lock on the production file, and forwards the snapshot request to that secondary storage server.

Once the secondary storage server has completed the initial step 491, execution continues to step 492. In step 492 the secondary storage server and the storage allocation server set all blocks in their respective mapping caches for the production file to the "READ-ONLY" state. Then in step 493 the storage allocation server saves the current snapshot block map for the current snapshot of the production file and begins a new snapshot block map for the production file. For example, the storage allocation server clones the production file inode to create a new snapshot inode, and then changes a pointer to substitute the new snapshot inode for the current snapshot inode. Next, in step 494, the storage allocation server may request the secondary to release pre-allocated blocks or receive new mapping information for pre-allocated blocks. After any requested changes have been made to the maps of pre-allocated blocks in the secondary storage server and in the storage allocation server, execution continues to step 495. In step 495, the secondary storage server resumes processing of write operations upon the production file.

The storage block mapping protocol as described above can also be used between a storage allocation server and a storage allocation client in a cached disk array in order to provide virtualization of logical units of the storage in the cached disk array.

A major problem for customers of storage is managing the proliferation of storage arrays within their environment. Typically, each storage array manages its captive disks independently of any other storage array, and arrays from different vendors often provide incompatible management software and features. Virtualization of storage arrays is an approach that potentially allows customers to get a better return on their storage investment. A virtualization solution builds logical storage devices out of collections or fragments of physical storage devices. Inserting a logical-to-physical storage mapping layer in the I/O stack enables advanced storage features such as sparse provisioning, snapshots, and logical units (LUs) which span multiple physical arrays.

A cost associated with virtualization is the overhead of resolving the logical-to-physical address mapping for each I/O to a virtual device. One typical storage virtualization approach is to centralize this mapping calculation at a network switch blade which is positioned between the hosts and the storage array on the I/O path. Centralized map resolution simplifies the virtualization problem since it avoids the need for a map consistency and locking mechanism. However, the scalability of centralized map resolution is clearly a problem, since the only way to scale is to increase the power and cost of the mapping switch blade.

A solution to the problem of centralized map resolution is to put mapping for block resolution of virtual logical units (LUs) into a front-end director or a disk director of a cached disk storage array. A scalable solution results by putting space allocation and management of the mapping information under control of one or more storage allocation servers, and using a storage block mapping protocol to distribute the space allocation and mapping information from the storage allocation servers to front-end directors or disk directors in the data paths to the storage devices.

In a preferred implementation, the mapping for block resolution of a virtual LU is provided by a file system data structure and its mechanism for linking file system data blocks to the file system data structure. Thus, a virtual LU can be exported from the array as a file in the file system. In the array, however, a storage allocation client performs the logical-to-physical mapping in response to storage access requests from hosts in order to directly access the physical storage. As needed, the storage allocation client requests storage block allocations from a storage allocation server assigned to manage the mapping information for the LU, and once data is first written to the storage block allocations, the storage allocation client requests the storage allocation server to commit the storage allocations.

In a preferred implementation, the storage allocation client and the storage allocation server may function as described above with respect to the file server 402 and storage allocation server 403 in FIG. 14 for the management of snapshots. Storage container files for the virtual LUs provide location independence, sparse allocation, and a scalable number of snapshots for the virtual LUs. The storage block allocation protocol (i.e., Get Map, Allocate Block, Commit Metadata) permits the storage allocation client to access the data contained in the LU files directly from the physical storage devices containing the storage blocks mapped to the file blocks. While the space allocation and management for block virtualization is put under the central control of a storage allocation server managing metadata of the storage container file system, the task of resolving logical-to-physical address mapping can be distributed to a very large number of storage allocation clients, thus achieving tremendous scalability of the data path for virtual LUs.

In a preferred implementation, storage is virtualized by embedding software for the storage allocation server and the storage allocation clients into the front-end directors or disk directors of a cached disk array. This provides immediate benefits to the cached disk array by enabling new functionality. Furthermore, since the cached disk array has features not generally available on typical host platforms (i.e., large memory cache and non-volatile RAM), this embedding makes certain aspects of the storage virtualization more efficient.

Figure 22:
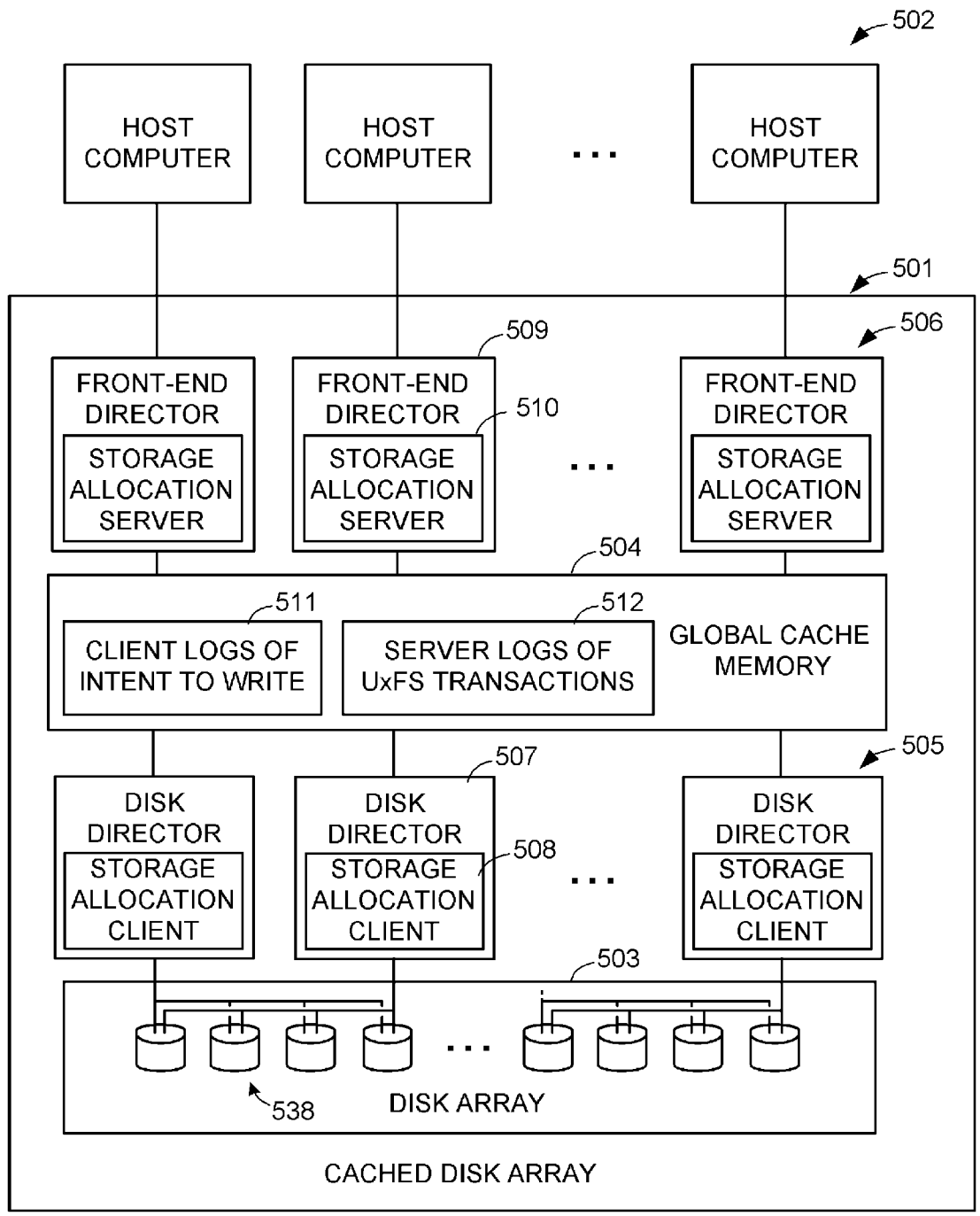
FIG. 22 is a block diagram of a data network including multiple host computers accessing a cached disk array including storage allocation servers and logical unit (LU) file servers.

FIG. 22 shows one way of programming a cached disk array 501 for virtualization of storage accessed by host computers 502. For example, the cached disk array 501 is a SYMMETRIX (Trademark) brand cached disk array manufactured by EMC Corporation, 171 South Street, Hopkinton, Mass., 01748-9103. The cached disk array 501 includes an array of disk drives 503, a large capacity semiconductor cache memory 504, disk directors 505, and front-end directors 506. The disk directors 505 "stage" requested data from the disk array 503 to the cache memory 504, and write new data from the cache memory 504 to the disk array 503 in a background process. Each of the disk directors 505 can directly access one or more strings of disk drives in the disk array 503; for example, the disk director 570 directly accesses a string 538 of the disk drives. The front-end directors 506 link the host computers 502 to the cache memory 504. In addition to providing intermediate storage for the data transferred between the front-end directors 506 and the disk directors 505, the cache memory 504 also provides intermediate storage for control information transferred among the front-end directors 506 and the disk directors 505.

Figure 23:
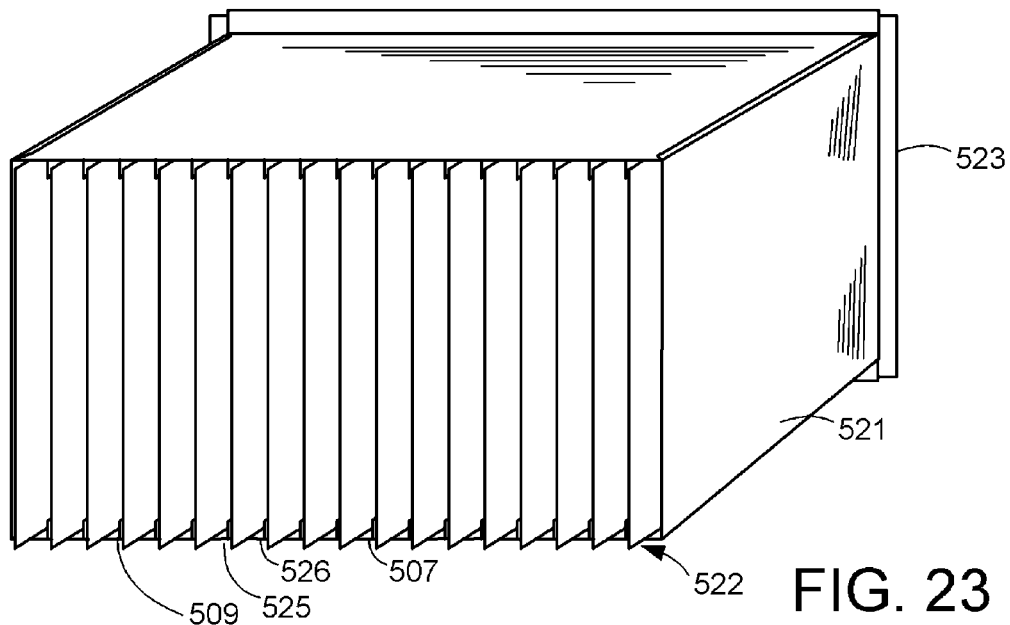
FIG. 23 is a perspective view of a rack of processor and cache memory blades in the cached disk array of FIG. 22.

As shown in FIG. 23, the disk directors and front-end directors are programmed processor blades or circuit boards 522 inserted into a rack or card cage 521. These circuit boards or blades 522 include cache memory boards 525, 526. The circuit boards or blades 522 are interconnected by a backplane 523 of the rack or card cage 521. Further details regarding the conventional construction of a cached disk array are found in Yanai et al. U.S. Pat. No. 5,206,939 issued Apr. 27, 1993.

As shown in FIG. 22, each of the front-end directors 506 is programmed with storage server software 510 for storage allocation and metadata management of LUs assigned to the host computer to which the front-end director is connected. The storage allocation servers access server logs 512 of UxFS transactions in the global cache memory 504. Because the transaction log 512 is typically less than 64 megabytes, it can be entirely contained in the global cache, which can significantly improve performance. By protecting the global cache memory from crashes by battery backup, correctness is not sacrificed.

Each of the disk directors 505 is programmed with storage allocation client software 508 for direct access to the disk drives in the disk array that are strung to the disk director. The storage allocation clients access client logs 511 of intent to write information in the global cache memory 504. These intent logs are significantly faster because they are held in protected global cache memory.

Incorporation of the storage allocation servers and the storage allocation clients into a cached disk array provide a number of additional advantages, including thin provisioning of the LUs, transparent relocation of the LUs, and scalable write-anywhere snapshots of the LUs.

Since UxFS files are sparse by default, mapping virtual LUs to files allows the presentation of a LU of a certain size, but which only consumes a subset of that amount of storage, namely those blocks which actually contain data written from the host. This feature is achieved by allocating space to the LU on a small extent granularity as writes are applied to the LU. The pool of storage that can ultimately be allocated to a sparse LU is a single UxFS file system. Multiple virtual LUs can be hosted on a single UxFS file system (as long as there are inodes available) and draw blocks of storage from the same pool. Given application level knowledge about which blocks are no longer used by the host, those blocks can be freed from one LU and made available for use by other LUs, simply by removing the blocks from the LU's container file mapping.

Virtual LUs can be transparently relocated. The storage block mapping protocol allows the storage allocation server to recall (invalidate) mapping information from storage allocation clients. This feature can be used to recall and update the mapping for a virtual LU when its data is moved from one physical location to another.

UxFS files can have a virtually unlimited number of snapshot copies (again, the only limit is the number of inodes available in the file system). Each snapshot is represented by a separate file system inode, with an independent block mapping, but data blocks which are the same in two successive versions are shared. This means that the various snapshots of a logical LU are stored compactly and efficiently, and the system has an efficient means to access the mapping for any snapshot. Maintenance of the snapshots minimizes copy-on-write by preserving existing data and allocating new space from the file system to hold new data. Copy-on-write is only desirable for partial blocks writes, when the I/O size is less than the file system allocation granularity (typically 8$k$ bytes). Because the storage allocation clients are embedded in the storage array, many of these copy-on-write operations can be performed internally and thus very efficiently because they never cross the network.

It is also possible for a virtual LU to span multiple storage arrays, by building a single UxFS file system across physical devices contained in multiple storage arrays. In this case, the storage allocation client that performs the logical-to-physical mapping for the virtual LU is given access to all of the physical devices on which the virtual LU is built, for example, over a network link or a dedicated link between the multiple storage arrays. Specific examples are described below with reference to FIGS. 27 and 28.

There are several possible ways to embed storage allocation servers and storage allocation clients into a storage array. The choices revolve around the boundaries of each individual UxFS file system of LUs, and where the storage allocation server and storage allocation client software will be run. Each file system represents a shared pool of storage space from which virtual LUs (and their snapshots) can be provisioned. Thus, the storage allocation server is given access to disk drives containing the storage for metadata of the LU file system, and the LU file is given access to disk drives containing storage for data of the LU file system. This means that the intended scope of each pool of storage dictates where the storage allocation server and storage allocation clients for each pool should be run.

The simplest case is to bind a single pool from the set of disks managed by a single controller of the storage array. In this case, the storage allocation client can run on the controller itself The storage allocation server could also run on the controller, but since it is desirable for the storage allocation server to support many pools on many controllers, the storage allocation server would be better placed on a processor that has read/write access to as many controllers as possible. For this reason, in the cached disk array of FIG. 22, a storage allocation client is run on each disk director for access to the respective disk drives that are strung to the disk director, and the allocation servers are run on the front-end directors.

Figure 24:
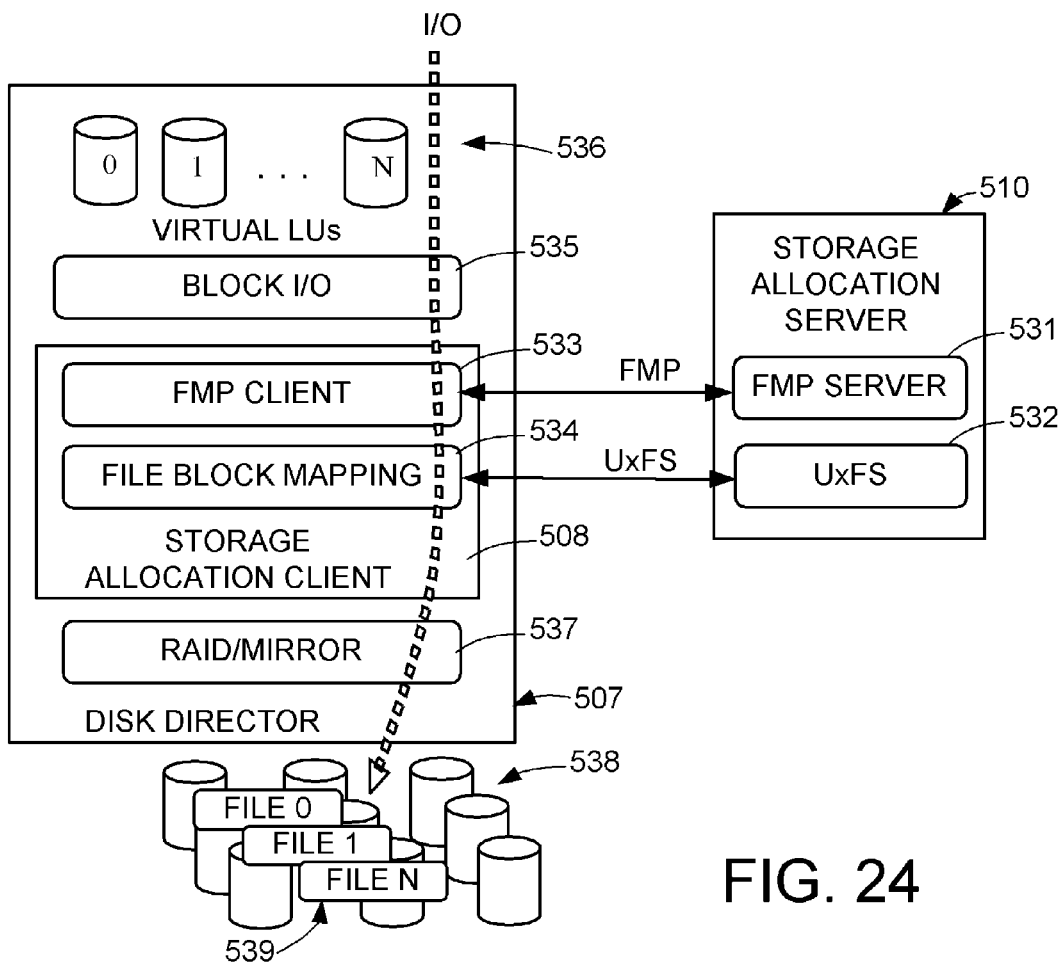
FIG. 24 is a functional block diagram showing data and control flow between a storage allocation server and a storage allocation client in the cached disk array of FIG. 22.

The data path of an I/O for the simplest case is shown in FIG. 24. The disk director 507 presents a set of N virtual LUs to the host. Each virtual LU appears as a block of contiguous logical storage addresses to the host. The storage allocation client maps each block of contiguous logical storage addresses to data block of one of the files 539 spread over the disk drives 538 strung to the disk director 407. The disk director 507 is typically programmed with a block I/O module 535 for responding to block I/O requests from a front-end director, and a RAID/mirror module 537 for striping or mirroring logical data blocks to storage blocks of the disk drives 538.

The storage allocation client 508 is layered between the block I/O module 535 and the RAID/mirror module 537. The I/O requests pass from the block I/O module 535 to a file block mapping module of 534 of the storage allocation client, and from the file block mapping module 534 to the RAID/mirror module 537. The storage allocation client 508 has an FMP client module 533 for requesting block allocations and metadata from an FMP server module 531 in the storage allocation server 510. The storage allocation server 510 has a UxFS module 532 for managing the UxFS file system of the LU files.

In the simple case of FIG. 24, the UxFS pool 538 is spread across all of the physical disks and RAID groups 538 owned by the disk director 507. The disk director 507 can then export virtual LUs which consume storage space from the pool as data is written into them. Snapshots of the virtual LUs will automatically consume free space in the pool. The simplicity of this case is that from the outside, the disk director 507 appears unchanged—it simply exports LUs which happen to have extra functionality. The downside of this simple case is that a single virtual LU can never grow beyond the confines of the disks attached to a single disk director. This segmentation of the disk storage introduces load balancing and utilization issues.

The next possible case is to allow a single UxFS pool to be spread over the disks of multiple controllers. Since the storage allocation client for the UxFS pool should have read/write access to all physical disks in the pool, it should only run on the disk director if there is a way to service read/write requests between different disk controllers. Otherwise the storage allocation client should run somewhere it can get read/write access to all the controllers on which the pool is built, such as on a front-end director.

Figure 25:
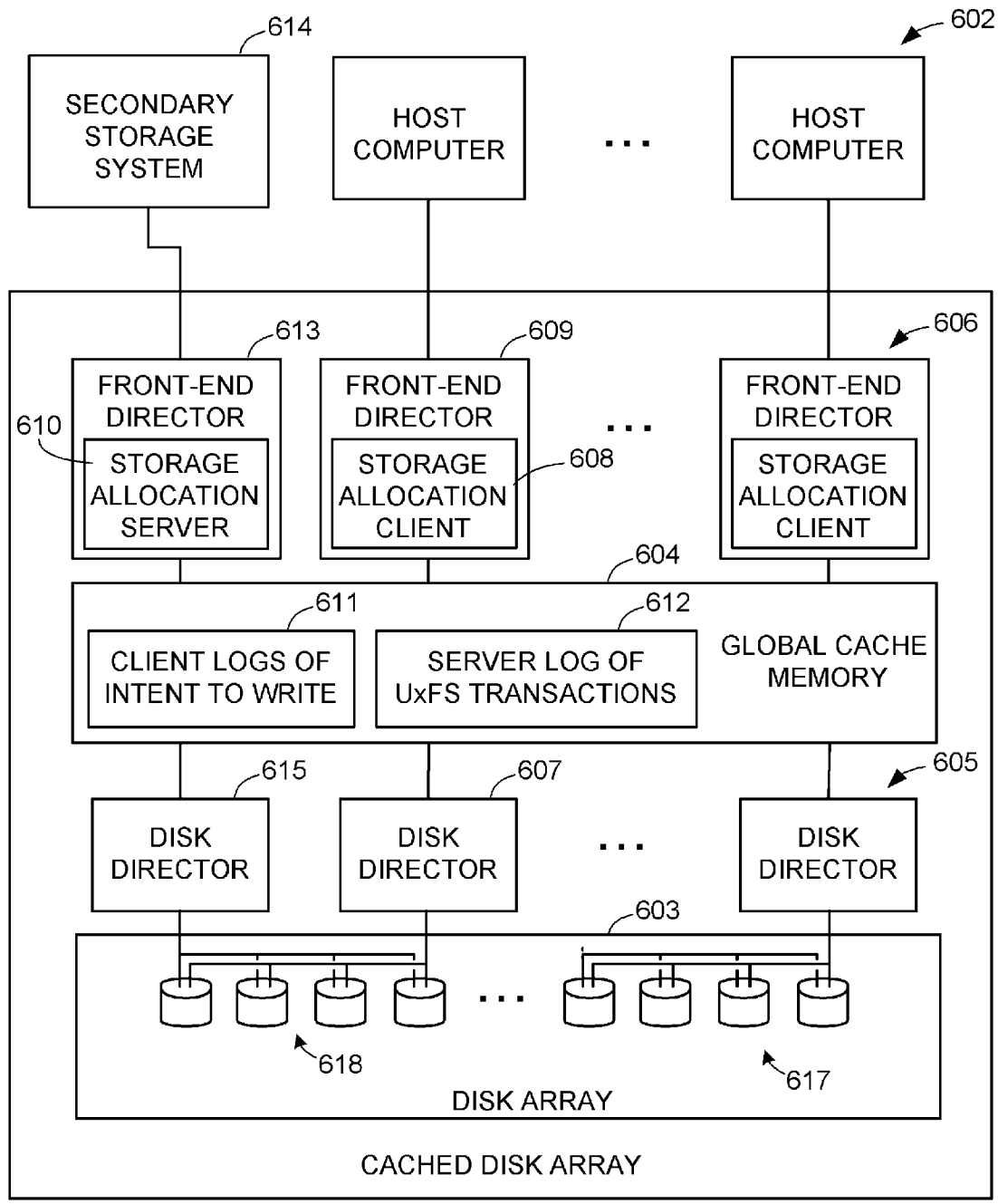
FIG. 25 is a block diagram of another data network including multiple host computers accessing a cached disk array including storage allocation servers and storage allocation clients.

FIG. 25 shows an example of a cached disk array 601 programmed in accordance with the second possible case. In this example, each front-end director 606 coupled to one of the host computers 602 is programmed with a storage allocation client 608 for providing the host computer with I/O access to a respective set of logical LUs. A front-end director 613 coupled to a secondary storage system 614 is programmed with a storage allocation server 610 for managing metadata of the file system of the LUs and for migrating data owned exclusively by snapshot copies of the LUs to the secondary storage system. The global cache memory 604 contains client logs 611 of intent to write information from the storage allocation clients, and a server log 612 of UxFS transactions from the storage allocation server 610. Disk directors 605 couple the disk array 603 to the global cache memory 604.

Figure 26:
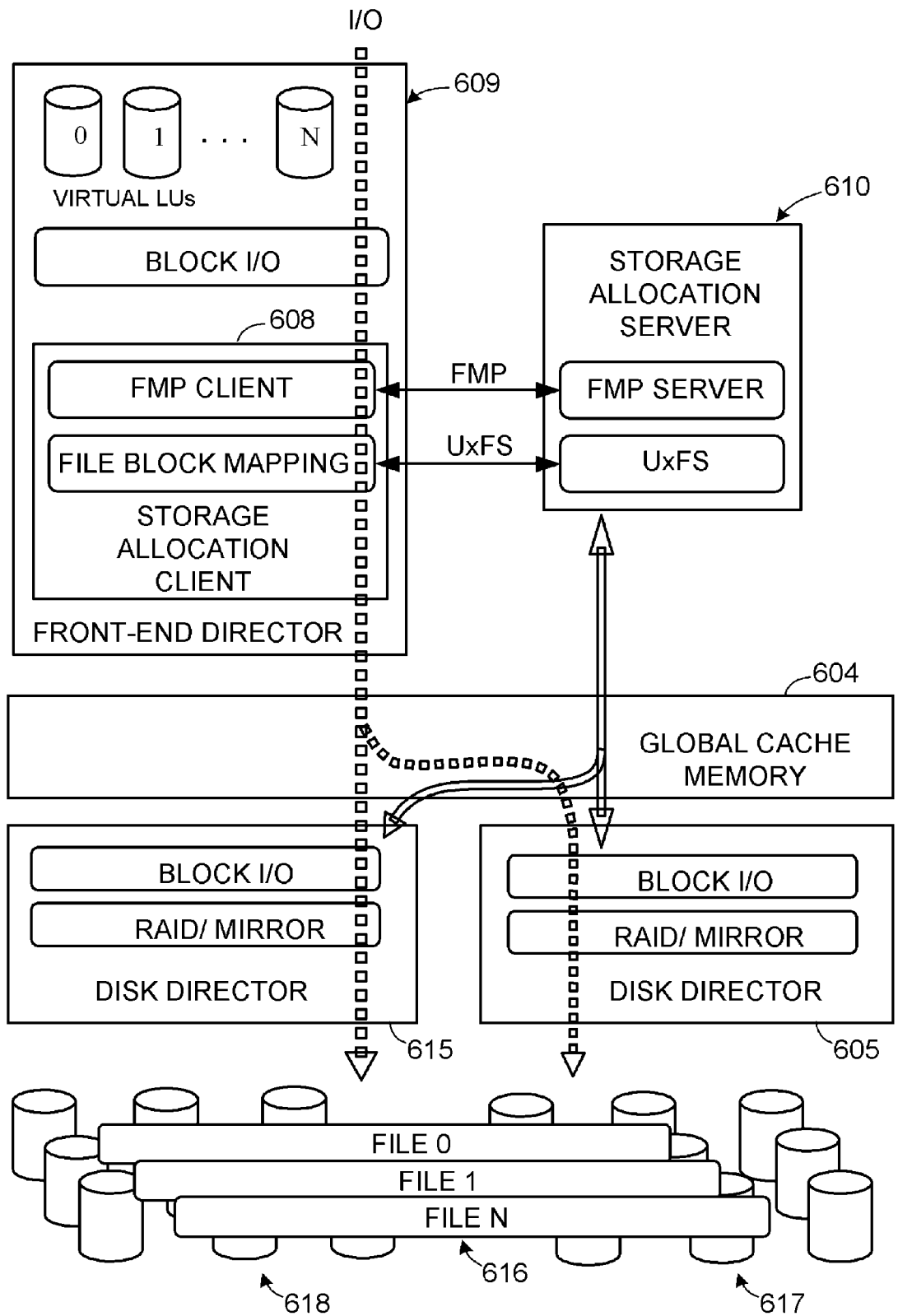
FIG. 26 is a functional block diagram showing data and control flow between a storage allocation server and a storage allocation client in a front-end director of the cached disk array of FIG. 25 for striping files across disks controlled by more than one disk director.

FIG. 26 shows an I/O data path through the cached disk array of FIG. 25. In FIG. 26, the front-end director 609 presents virtual LUs, each of which is contained in a respective one of the files 616. Each of the files 616 is striped across disk drives 617 accessed by the disk director 605 and disk drives 618 accessed by the disk director 615. This configuration has the advantage that virtual LUs can use storage space drawn from a larger pool. Storage resources from the disks strung to either disk director 607 or 615 can be applied to populate virtual LUs or their snapshots.

Figure 27:
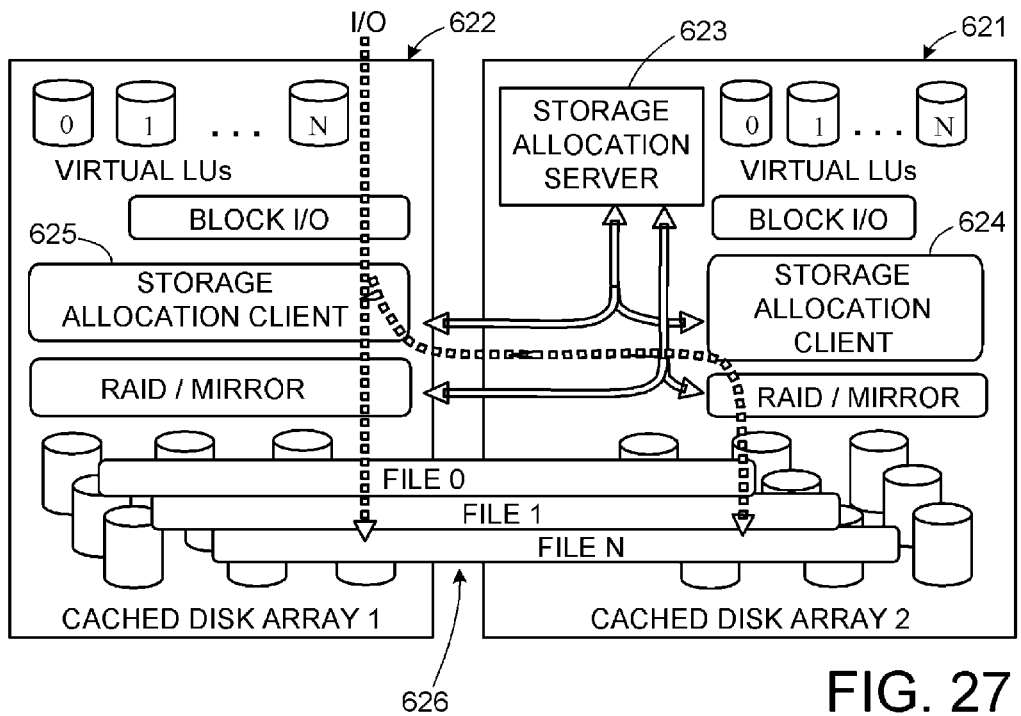
FIG. 27 is a functional block diagram showing data and control flow between two cached disk arrays, each having a storage allocation client for accessing at least one file striped across storage of both of the cached disk arrays.

As shown in FIG. 27, a single storage pool can be spread across multiple storage arrays 621, 622. In this case, all of the storage arrays can potentially export the same set of virtual LUs. For this purpose, the storage arrays are linked together for passing file data and I/O requests produced by a storage allocation client (624, 635) running in one array, to a physical disk director running in another array. For example, some of the I/O data shown in FIG. 25 passes between the storage arrays in order to target blocks of the virtual LU which are hosted on disk owned by the second array 621. This same data linkage between the storage arrays could be used by a single storage allocation server 623 running in one of the arrays 621 for passing metadata between the storage arrays for building and managing the file system across all of the storage arrays. Thus, a single one of the container files 626 for the virtual LUs can be striped across disk drives in both of the storage arrays 621, 622. These virtual LUs are available from either of the storage arrays 621, 622.

Figure 28:
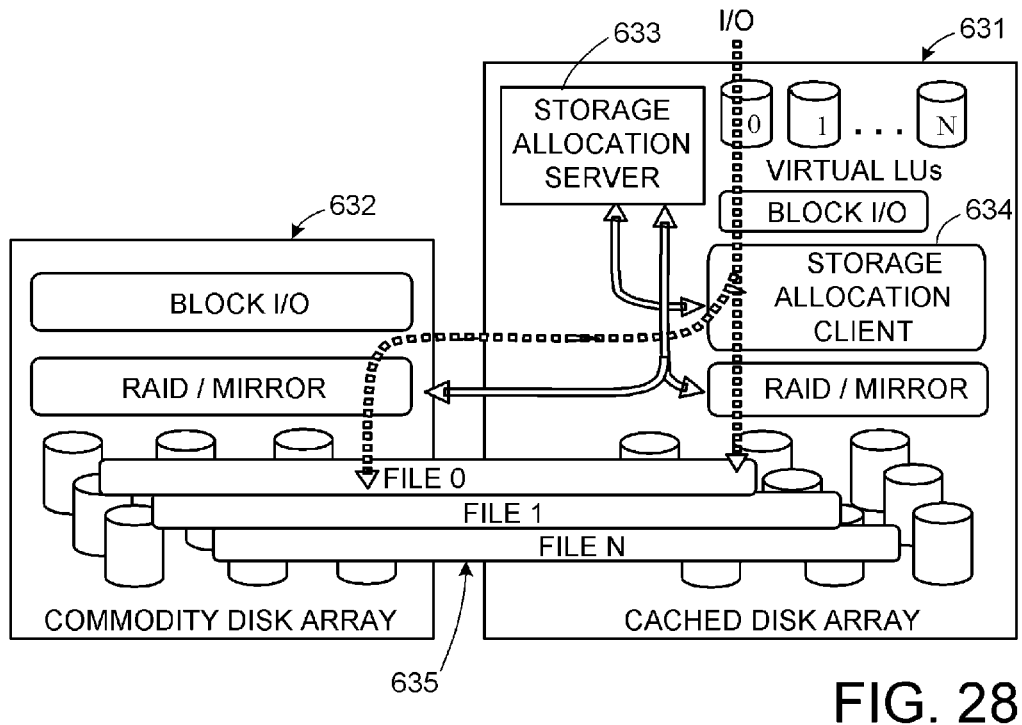
FIG. 28 is a functional block diagram showing data and control flow between a cached disk array and a commodity storage array, the cached disk array having a storage allocation client for accessing at least one file striped across storage of both the cache disk array and the commodity storage array.

As shown in FIG. 28, it is also possible for a storage pool to be spread across a commodity disk array 623 and a storage array 631 programmed with a storage allocation server 633 and a storage allocation client 634. In this case, the storage array 631 programmed with the storage allocation server 633 and the storage allocation client 634 is linked to the commodity disk array 632 so that the storage allocation client 634 can send block I/O requests to the commodity disk array 632 and send or receive block I/O data to or from the commodity disk array. The file of a single virtual LU can be striped across disks in the storage array 631 and disks in the commodity storage array 632. The storage array 631 may export the virtual LUs, but the commodity disk array 632 cannot export the virtual LUs.

In the configuration of FIG. 28, there is no need to store metadata of the LU container files 635 in the commodity disk array 632, since the metadata can be stored in the storage array 631 where it is directly accessible by the storage allocation server 633. In other configurations, and for other reasons, it may also be desirable to partition the storage in various ways.

Figure 29:
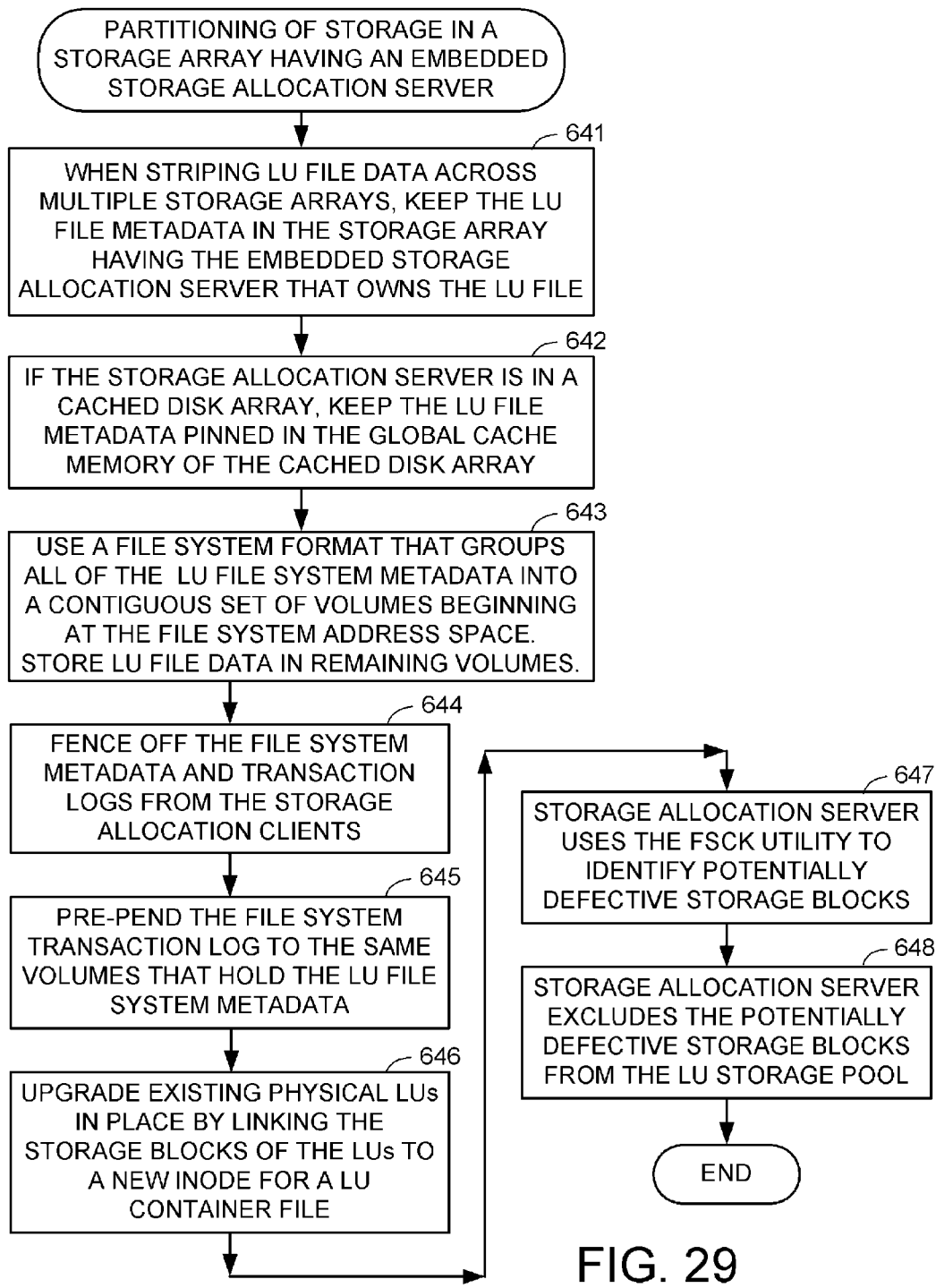
FIG. 29 is a flowchart of partitioning of storage in a storage array having an embedded storage allocation server.

FIG. 29 shows a number of ways of partitioning storage in a storage array having an embedded storage allocation server.

In a first step 641, when striping the LU file data across multiple storage arrays, the LU file metadata is kept in the storage array having the embedded storage allocation server that owns the LU file. In a second step 642, if the storage allocation server is in a cached disk array, then the LU file metadata is pinned in the global cache memory of the cached disk array. The conventional UxFS on-disk format, for example, mixes file system metadata (bitmaps, inodes, and indirect blocks) with file system data at fixed intervals over all of the physical disks that the file system comprises. The ratio of metadata to data within a typical UxFS file system is never more than 3%, and is often much less. Since the metadata that makes up the file system is quite small, is would be possible to keep the metadata in global protected memory of the storage array, rather than flushing it to disk.

In step 643, to facilitate the separation of metadata from data and the pinning of the metadata in global protected memory, the UxFS on-disk format can be changed to group all of the file system metadata onto a contiguous set of volumes at the beginning of the file system address space. The remaining volumes which make up the file system are used for storing data only. Once the data and metadata in the file system are strictly partitioned, it becomes easy to pin the metadata volumes in global cache memory. This has the effect of improving the latency of metadata operations, and providing an extra level of protection for file system metadata.

In step 644, the file system metadata and transaction logs are fenced off from the storage allocation clients. Once metadata and data are strictly partitioned, the metadata volumes are made accessible only to the storage allocation server that owns the metadata, and not to any of the storage allocation clients. This significantly reduces the chance of write errors corrupting the file system metadata. A similar approach can be used for the file system transaction log. This log can be pre-pended to the same volumes which hold the file system metadata. Since only the storage allocation server needs access to the file system transaction log, the storage allocation clients can be fenced from the volumes holding it, increasing the safety of the log. Also, since the file system transaction log can be kept in fast global cache, the latency of logging transactions can be reduced.

Another powerful benefit of partitioning file system metadata from data is the ability to "upgrade" an existing array LU in place. By "upgrade," it is meant that it is possible to create a virtual LU which contains exactly the same data as an existing physical LU, with no data copy. In step 646, an existing physical LU is upgraded in place by linking the storage blocks to a new inode for a LU container file. Immediately after the upgrade, the virtual LU would contain the same physical blocks and data as the old physical LU. However, since the LU would now be virtual, it would be possible to start taking snapshot copies of the LU, and new writes to the LU would be able to consume space from the remainder of the UxFS pool. The reason this becomes possible is that once data and metadata within the file system are strictly partitioned, it becomes possible for a UxFS file system to dynamically consume contiguous ranges of physical blocks, regardless of size, simply by updating its volume mapping. Once the physical blocks of the LU are added to the pool of data blocks in the file system, a container file can be built which includes exactly the blocks of the physical LU.

The ability to upgrade an existing LU in place provides a smooth upgrade path for existing systems. Once an existing storage array is programmed with storage allocation and storage allocation clients, the system administrator can decide which existing LUs should be virtualized. The system administrator can then use the storage allocation server to build a UxFS pool encompassing those LUs, plus some extra storage to store snapshot copy information, build new virtual LUs which correspond to the old physical LUs, and finally, start taking snapshots of the new LUs.

Initially, when a first snapshot is taken, the space occupied by the old physical LUs cannot be reclaimed for general use by the pool, since the system has no knowledge about which blocks contain live data. However, as snapshots are taken, and the original "level 0" copy of the LU ages, at some point the system administrator may wish to refresh the oldest snapshot. At this point, all of the blocks of this snapshot that are not currently in use by newer versions (that is, all of the blocks which have been overwritten since the snapshot was created), are freed and returned to the pool for general use. In this way, the space of the original physical LUs can be reclaimed for general use as part of the natural snapshot lifecycle.

In step 647, the storage allocation server uses the FSCK utility for identifying potentially defective storage blocks. FSCK is the standard file system consistency checking tool for UxFS. In its current form it is designed to detect and repair certain file system data structure inconsistencies that can result from either software or hardware corruption. For instance, it can identify whether a single disk block is referenced by multiple files. In the storage array context, FSCK can be put to more general uses. One in particular is the identification and tracking of bad disk blocks. Currently, there is an absolute threshold of block failures that a single RAID group can tolerate before the entire RAID group is considered to be failed. FSCK can be enhanced to constantly check for failed blocks on disk, and when found, can take corrective action. In particular, the block can be marked as "used" within the UxFS pool. Therefore, in step 648, the storage allocation server excludes the potentially defective storage blocks from the LU storage pool, so that they will not be used again by any virtual LU. Also, the logical block of the virtual LU which was mapped to the failed block can be transparently remapped to a new location chosen from the pool. Thus a much larger number of failed blocks within a RAID group can be tolerated, since each failed block is isolated by the system and never used again. Continuing block failures simply result in a slow "leak" of available storage space.

In view of the above, there has been described a data processing system including a first data processor that pre-allocates data blocks of storage for use in a file system at a later time when a second data processor needs data blocks for extending the file system. The second data processor selectively maps the logical addresses of the pre-allocated blocks so that when the pre-allocated blocks are used in the file system, the layout of the file system on disk is improved to reduce block scatter and enhance I/O performance. The selected mapping can be done at a program layer between a conventional file system manager and a conventional logical volume layer so that there is no need to modify the data block mapping mechanism of the file system manager or the logical volume layer. The data blocks can be pre-allocated adaptively in accordance with the allocation history of the file system.

What is claimed is:

1. A method of operating a primary data processor and a secondary data processor for access to a file system in data storage, said method comprising:

the primary data processor pre-allocating data blocks of the data storage to the file system before the pre-allocated data blocks are needed by the secondary data processor for extending the file system, and the secondary data processor using at least some of the pre-allocated data blocks for extending the file system, wherein the primary data processor pre-allocates an initial chunk size of data blocks when the file system is created, and upon expiration of a release timeout duration from the pre-allocation of the initial chunk size, the secondary data processor releases to the primary data processor an excess of the pre-allocated data blocks over a release threshold.

2. The method as claimed in claim 1, wherein respective groups of the data blocks pre-allocated to the file system are further pre-allocated to different processes writing to a sparse file of the file system.

3. The method as claimed in claim 1, wherein the primary data processor pre-allocates the data blocks to the file system by linking the pre-allocated data blocks to a sparse file.

4. The method as claimed in claim 1, wherein the primary data processor pre-allocates a subsequent chunk size of data blocks in response to the number of pre-allocated data blocks falling below a reserve threshold.

5. The method as claimed in claim 1, wherein the primary data processor pre-allocates a respective disjoint set of data blocks of the data storage to each of a plurality of secondary data processors, and maintains a map of free data blocks and a respective map of the data blocks that have been pre-allocated to each of the secondary data processors and not yet committed to file systems in the data storage.

6. A data processing system comprising:

data storage;

a primary data processor programmed to pre-allocate data blocks of the data storage to a file system in the data storage before the pre-allocated data blocks are needed for extending the file system; and a secondary data processor coupled to the data storage for using at least some of the pre-allocated data blocks for extending the file system, wherein the primary data processor is programmed to pre-allocate an initial chunk size of data blocks when the file system is created, and the secondary data processor is programmed to release to the primary data processor an excess of the pre-allocated data blocks over a release threshold upon expiration of a release timeout duration from the preallocation of the initial chunk size.

7. The data processing system as claimed in claim 6, wherein the secondary data processor is programmed to pre-allocate respective groups of the data blocks to different processes writing to a sparse file of the file system.

8. The data processing system as claimed in claim 6, wherein the primary data processor is programmed to pre-allocate data blocks of the data storage to the file system by linking the pre-allocated data blocks to a sparse file.

9. The data processing system as claimed in claim 6, wherein the primary data processor is programmed to pre-allocate a subsequent chunk size of data blocks in response to the number of pre-allocated data blocks falling below a reserve threshold.

10. The data processing system as claimed in claim 6, wherein the primary data processor is programmed to pre-allocate a respective disjoint set of data blocks of the data storage to each of a plurality of secondary data processors, and to maintain a map of free data blocks and a respective map of the data blocks that have been pre-allocated to each of the secondary data processors and not yet committed to file systems in the data storage.

* * * * *